US012762536B2

(12) United States Patent
Kumar et al.

(10) Patent No.: US 12,762,536 B2
(45) Date of Patent: Oct. 13, 2026

(54) SYSTEMS AND METHODS FOR PROVISIONING TRANSACTION CARDS TO MULTIPLE MERCHANTS

(71) Applicant: Capital One Services, LLC, McLean, VA (US)

(72) Inventors: Kaush Kumar, Vienna, VA (US); Jeffrey Rule, Chevy Chase, MD (US); Jinlian Wang, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 226 days.

(21) Appl. No.: 18/136,497

(22) Filed: Apr. 19, 2023

(65) Prior Publication Data

US 2024/0354741 A1 Oct. 24, 2024

(51) Int. Cl.
*G06Q 20/34* (2012.01)
*G06Q 20/40* (2012.01)

(52) U.S. Cl.
CPC ......... *G06Q 20/352* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

• Federal Financial Institutions Examination Council. "Retail Payment Systems." (Apr. 2016). Retrieved online Jun. 6, 2025. https://afsaonline.org/wp-content/uploads/2021/07/Retail-Payment-Systems-IT-Booklet.pdf (Year: 2016).*

(Continued)

*Primary Examiner* — James A Reagan
(74) *Attorney, Agent, or Firm* — KDW Firm, PLLC

(57) ABSTRACT

Systems, methods, apparatuses, and computer-readable media for provisioning transaction cards to multiple merchants from a single access point are described. For example, a method may include receiving a payment card number request, sending a contactless payment card step-up authentication request to the user device, receiving, from the user device, encrypted authentication information obtained from the contactless payment card in response to the contactless payment card step-up request, authenticating the encrypted authentication information received from the user device, granting a token to identify a communication session established with the merchant, which may enable a continued exchange of data with the merchant, and using the token to identify the respective communication session established with the merchant, providing account information to the merchant to associate a respective merchant account with a user of the contactless payment card.

20 Claims, 14 Drawing Sheets

(56) References Cited

U.S. PATENT DOCUMENTS 5,036,461 A 7/1991 Elliott et al.
5,363,448 A 11/1994 Koopman, Jr. et al.
5,377,270 A 12/1994 Koopman, Jr. et al.
5,533,126 A 7/1996 Hazard
5,537,314 A 7/1996 Kanter
5,590,038 A 12/1996 Pitroda
5,592,553 A 1/1997 Guski et al.
5,616,901 A 4/1997 Crandall
5,666,415 A 9/1997 Kaufman
5,763,373 A 6/1998 Robinson et al.
5,764,789 A 6/1998 Pare, Jr. et al.
5,768,373 A 6/1998 Lohstroh et al.
5,778,072 A 7/1998 Samar
5,796,827 A 8/1998 Coppersmith et al.
5,832,090 A 11/1998 Raspotnik
5,883,810 A 3/1999 Franklin et al.
5,901,874 A 5/1999 Deters
5,929,413 A 7/1999 Gardner
5,960,411 A 9/1999 Hartman et al.
6,021,203 A 2/2000 Douceur et al.
6,049,328 A 4/2000 Vanderheiden
6,058,373 A 5/2000 Blinn et al.
6,061,666 A 5/2000 Do et al.
6,105,013 A 8/2000 Curry et al.
6,199,114 B1 3/2001 White et al.
6,199,762 B1 3/2001 Hohle
6,216,227 B1 4/2001 Goldstein et al.
6,227,447 B1 5/2001 Campisano
6,282,522 B1 8/2001 Davis et al.
6,324,271 B1 11/2001 Sawyer et al.
6,342,844 B1 1/2002 Rozin
6,367,011 B1 4/2002 Lee et al.
6,402,028 B1 6/2002 Graham, Jr. et al.
6,438,550 B1 8/2002 Doyle et al.
6,501,847 B2 12/2002 Helot et al.
6,572,015 B1 6/2003 Norton
6,631,197 B1 10/2003 Taenzer
6,631,849 B2 * 10/2003 Blossom .......... G06K 19/07703 235/492
6,641,050 B2 11/2003 Kelley et al.
6,655,585 B2 12/2003 Shinn
6,662,020 B1 12/2003 Aaro et al.
6,721,706 B1 4/2004 Strubbe et al.
6,731,778 B1 5/2004 Oda et al.
6,779,115 B1 8/2004 Naim
6,792,533 B2 9/2004 Jablon
6,829,711 B1 12/2004 Kwok et al.
6,834,271 B1 12/2004 Hodgson et al.
6,834,795 B1 12/2004 Rasmussen et al.
6,852,031 B1 2/2005 Rowe
6,865,547 B1 3/2005 Brake, Jr. et al.
6,873,260 B2 3/2005 Lancos et al.
6,873,974 B1 * 3/2005 Schutzer ................ G06Q 20/26 705/40
6,877,656 B1 4/2005 Jaros et al.
6,889,198 B2 5/2005 Kawan
6,905,411 B2 6/2005 Nguyen et al.
6,910,627 B1 6/2005 Simpson-Young et al.
6,971,031 B2 11/2005 Haala
6,990,588 B1 1/2006 Yasukura
7,006,986 B1 2/2006 Sines et al.
7,085,931 B1 8/2006 Smith et al.
7,127,605 B1 10/2006 Montgomery et al.
7,128,274 B2 * 10/2006 Kelley ................. G06Q 20/341 235/492
7,140,550 B2 11/2006 Ramachandran
7,152,045 B2 12/2006 Hoffman
7,165,727 B2 1/2007 de Jong
7,175,076 B1 2/2007 Block et al.
7,202,773 B1 4/2007 Oba et al.
7,206,806 B2 4/2007 Pineau
7,232,073 B1 6/2007 de Jong
7,246,752 B2 7/2007 Brown
7,252,242 B2 8/2007 Ho
7,254,569 B2 8/2007 Goodman et al.
7,263,507 B1 8/2007 Brake, Jr. et al.
7,270,276 B2 9/2007 Vayssiere
7,278,025 B2 10/2007 Saito et al.
7,287,692 B1 10/2007 Patel et al.
7,290,709 B2 11/2007 Tsai et al.
7,306,143 B2 12/2007 Bonneau, Jr. et al.
7,319,986 B2 1/2008 Praisner et al.
7,325,132 B2 1/2008 Takayama et al.
7,360,688 B1 * 4/2008 Harris .................. G06K 7/0047 235/492
7,373,515 B2 5/2008 Owen et al.
7,374,099 B2 5/2008 de Jong
7,375,616 B2 5/2008 Rowse et al.
7,380,710 B2 6/2008 Brown
7,424,977 B2 9/2008 Smets et al.
7,453,439 B1 11/2008 Kushler et al.
7,472,829 B2 1/2009 Brown
7,487,357 B2 2/2009 Smith et al.
7,527,208 B2 5/2009 Hammad
7,568,631 B2 8/2009 Gibbs et al.
7,580,898 B2 * 8/2009 Brown .................. G07F 7/1083 705/50
7,584,153 B2 9/2009 Brown et al.
7,597,250 B2 10/2009 Finn
7,628,322 B2 12/2009 Holtmanns et al.
7,652,578 B2 1/2010 Braun et al.
7,689,832 B2 3/2010 Talmor et al.
7,703,142 B1 4/2010 Wilson et al.
7,748,609 B2 7/2010 Sachdeva et al.
7,748,617 B2 7/2010 Gray
7,748,636 B2 7/2010 Finn
7,762,457 B2 7/2010 Bonalle et al.
7,789,302 B2 9/2010 Tame
7,793,851 B2 * 9/2010 Mullen ............ G06K 19/07703 235/383
7,796,013 B2 9/2010 Murakami et al.
7,801,799 B1 9/2010 Brake, Jr. et al.
7,801,829 B2 9/2010 Gray et al.
7,805,755 B2 9/2010 Brown et al.
7,809,643 B2 10/2010 Phillips et al.
7,827,115 B2 11/2010 Weller et al.
7,828,214 B2 11/2010 Narendra et al.
7,848,746 B2 12/2010 Juels
7,882,553 B2 2/2011 Tuliani
7,900,048 B2 3/2011 Andersson
7,908,216 B1 3/2011 Davis et al.
7,922,082 B2 4/2011 Muscato
7,933,589 B1 4/2011 Mamdani et al.
7,949,559 B2 5/2011 Freiberg
7,954,716 B2 6/2011 Narendra et al.
7,954,723 B2 6/2011 Charrat
7,962,369 B2 6/2011 Rosenberg
7,993,197 B2 8/2011 Kaminkow
8,005,426 B2 8/2011 Huomo et al.
8,010,405 B1 8/2011 Bortolin et al.
RE42,762 E 9/2011 Shin et al.
8,041,954 B2 10/2011 Plesman
8,060,012 B2 11/2011 Sklovsky et al.
8,074,877 B2 12/2011 Mullen et al.
8,082,450 B2 12/2011 Frey et al.
8,095,113 B2 1/2012 Kean et al.
8,099,332 B2 1/2012 Lemay et al.
8,103,249 B2 1/2012 Markison
8,108,687 B2 1/2012 Ellis et al.
8,127,143 B2 2/2012 Abdallah et al.
8,135,648 B2 3/2012 Oram et al.
8,140,010 B2 3/2012 Symons et al.
8,141,136 B2 3/2012 Lee et al.
8,150,321 B2 4/2012 Winter et al.
8,150,767 B2 4/2012 Wankmueller
8,186,602 B2 5/2012 Itay et al.
8,196,131 B1 6/2012 von Behren et al.
8,215,563 B2 7/2012 Levy et al.
8,224,753 B2 7/2012 Atef et al.
8,232,879 B2 7/2012 Davis
8,233,841 B2 7/2012 Griffin et al.
8,245,292 B2 8/2012 Buer
8,249,654 B1 8/2012 Zhu
8,266,451 B2 9/2012 Leydier et al.

(56) References Cited

U.S. PATENT DOCUMENTS 8,276,814 B1 10/2012 Davis
8,285,329 B1 10/2012 Zhu
8,302,872 B2 11/2012 Mullen
8,312,519 B1 11/2012 Bailey et al.
8,316,237 B1 11/2012 Felsher et al.
8,332,272 B2 12/2012 Fisher
8,346,670 B2 1/2013 Hasson
8,365,988 B1 2/2013 Medina, III et al.
8,369,960 B2 2/2013 Tran et al.
8,371,501 B1 2/2013 Hopkins
8,381,307 B2 2/2013 Cimino
8,391,719 B2 3/2013 Alameh et al.
8,417,231 B2 4/2013 Sanding et al.
8,439,271 B2 5/2013 Smets et al.
8,442,914 B2 * 5/2013 Killian ................. G06Q 20/351 705/26.1
8,475,367 B1 7/2013 Yuen et al.
8,489,112 B2 7/2013 Roeding et al.
8,511,542 B2 8/2013 Pan
8,511,547 B2 8/2013 Rans
8,519,822 B2 8/2013 Riegebauer
8,559,872 B2 10/2013 Butler
8,566,916 B1 10/2013 Bailey et al.
8,567,670 B2 10/2013 Stanfield et al.
8,572,386 B2 10/2013 Takekawa et al.
8,577,810 B1 11/2013 Dalit et al.
8,583,454 B2 11/2013 Beraja et al.
8,589,335 B2 11/2013 Smith et al.
8,594,730 B2 11/2013 Bona et al.
8,615,468 B2 12/2013 Varadarajan
8,620,218 B2 12/2013 Awad
8,639,600 B2 * 1/2014 Lee ........................ G06Q 40/00 705/35
8,667,285 B2 3/2014 Coulier et al.
8,723,941 B1 5/2014 Shirbabadi et al.
8,726,405 B1 5/2014 Bailey et al.
8,740,073 B2 6/2014 Vijayshankar et al.
8,750,514 B2 6/2014 Gallo et al.
8,752,189 B2 6/2014 de Jong
8,794,509 B2 8/2014 Bishop et al.
8,799,668 B2 8/2014 Cheng
8,806,592 B2 8/2014 Ganesan
8,807,440 B1 8/2014 von Behren et al.
8,811,892 B2 8/2014 Khan et al.
8,814,039 B2 8/2014 Bishop et al.
8,814,052 B2 8/2014 Bona et al.
8,818,867 B2 8/2014 Baldwin et al.
8,850,538 B1 9/2014 Vernon et al.
8,861,733 B2 10/2014 Benteo et al.
8,870,081 B2 10/2014 Olson
8,880,027 B1 11/2014 Darringer
8,888,002 B2 11/2014 Marshall Chesney et al.
8,898,088 B2 11/2014 Springer et al.
8,934,837 B2 1/2015 Zhu et al.
8,939,356 B2 * 1/2015 Pourfallah ........... G06Q 20/387 235/375
8,977,569 B2 3/2015 Rao
8,994,498 B2 3/2015 Agrafioti et al.
9,004,365 B2 4/2015 Bona et al.
9,038,893 B2 5/2015 Kirkham
9,038,894 B2 5/2015 Khalid
9,042,814 B2 5/2015 Royston et al.
9,047,531 B2 6/2015 Showering et al.
9,069,976 B2 6/2015 Toole et al.
9,081,948 B2 7/2015 Magne
9,104,853 B2 8/2015 Venkataramani et al.
9,118,663 B1 8/2015 Bailey et al.
9,122,964 B2 9/2015 Krawczewicz
9,129,199 B2 9/2015 Spodak
9,129,280 B2 9/2015 Bona et al.
9,152,832 B2 10/2015 Royston et al.
9,183,490 B2 11/2015 Moreton
9,203,800 B2 12/2015 Izu et al.
9,209,867 B2 12/2015 Royston
9,251,330 B2 2/2016 Boivie et al.
9,251,518 B2 2/2016 Levin et al.
9,258,715 B2 2/2016 Borghei
9,270,337 B2 2/2016 Zhu et al.
9,275,325 B2 3/2016 Newcombe
9,286,606 B2 3/2016 Diamond
9,306,626 B2 4/2016 Hall et al.
9,306,753 B1 4/2016 Vandervort
9,306,942 B1 4/2016 Bailey et al.
9,324,066 B2 4/2016 Archer et al.
9,324,067 B2 4/2016 Van Os et al.
9,332,587 B2 5/2016 Salahshoor
9,338,622 B2 5/2016 Bjontegard
9,373,141 B1 6/2016 Shakkarwar
9,379,841 B2 6/2016 Fine et al.
9,413,430 B2 8/2016 Royston et al.
9,413,768 B1 8/2016 Gregg et al.
9,420,496 B1 8/2016 Indurkar
9,426,132 B1 8/2016 Alikhani
9,432,339 B1 8/2016 Bowness
9,455,968 B1 9/2016 Machani et al.
9,473,509 B2 10/2016 Arsanjani et al.
9,491,626 B2 11/2016 Sharma et al.
9,501,776 B2 11/2016 Martin
9,553,637 B2 1/2017 Yang et al.
9,619,952 B1 4/2017 Zhao et al.
9,635,000 B1 4/2017 Muftic
9,665,858 B1 5/2017 Kumar
9,674,705 B2 6/2017 Rose et al.
9,679,286 B2 6/2017 Colnot et al.
9,680,942 B2 6/2017 Dimmick
9,710,744 B2 7/2017 Wurmfeld
9,710,804 B2 7/2017 Zhou et al.
9,740,342 B2 8/2017 Paulsen et al.
9,740,988 B1 8/2017 Levin et al.
9,763,097 B2 9/2017 Robinson et al.
9,767,329 B2 9/2017 Forster
9,769,662 B1 9/2017 Queru
9,773,151 B2 9/2017 Mil'shtein et al.
9,780,953 B2 10/2017 Gaddam et al.
9,891,823 B2 2/2018 Feng et al.
9,940,571 B1 4/2018 Herrington
9,949,065 B2 4/2018 Zarakas
9,953,323 B2 4/2018 Candelore et al.
9,961,194 B1 5/2018 Wiechman et al.
9,965,632 B2 5/2018 Zarakas
9,965,756 B2 5/2018 Davis et al.
9,965,911 B2 5/2018 Wishne
9,977,890 B2 5/2018 Alberti
9,978,056 B2 5/2018 Seo
9,978,058 B2 5/2018 Wurmfeld et al.
9,990,795 B2 6/2018 Wurmfeld
10,007,873 B2 6/2018 Heo
10,013,693 B2 7/2018 Wyatt
10,043,164 B2 8/2018 Dogin et al.
10,075,437 B1 9/2018 Costigan et al.
10,121,130 B2 11/2018 Pinski
10,129,648 B1 11/2018 Hernandez et al.
10,133,979 B1 11/2018 Eidam et al.
10,210,505 B2 2/2019 Zarakas
10,217,105 B1 2/2019 Sangi et al.
10,242,368 B1 3/2019 Poole
10,296,910 B1 5/2019 Templeton
10,332,102 B2 6/2019 Zarakas
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule

(56) References Cited

U.S. PATENT DOCUMENTS 10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler
11,238,441 B1 * 2/2022 Mullins .................. G06Q 20/34
11,297,958 B2 4/2022 Vukich
11,334,872 B2 5/2022 Phillips
11,361,173 B2 6/2022 Edwards
11,392,933 B2 7/2022 Mossler
11,392,935 B2 7/2022 Suresh
11,416,844 B1 8/2022 Osterkamp
11,423,392 B1 8/2022 Ho
11,443,292 B2 9/2022 Sherif
11,444,770 B2 9/2022 Wieker
11,461,764 B2 10/2022 Rule
11,481,764 B2 10/2022 Shakkarwar
11,521,213 B2 12/2022 Rule
11,551,200 B1 1/2023 Cook
11,556,918 B2 1/2023 Mestre
11,615,395 B2 3/2023 McHugh
11,777,933 B2 10/2023 Moreton
2001/0010723 A1 8/2001 Pinkas
2001/0029485 A1 10/2001 Brody et al.
2001/0034702 A1 10/2001 Mockett et al.
2001/0054003 A1 12/2001 Chien et al.
2002/0078345 A1 6/2002 Sandhu et al.
2002/0093530 A1 7/2002 Krothapalli et al.
2002/0100808 A1 8/2002 Norwood et al.
2002/0120583 A1 8/2002 Keresman, III et al.
2002/0152116 A1 10/2002 Yan et al.
2002/0153424 A1 10/2002 Li
2002/0165827 A1 11/2002 Gien et al.
2003/0023554 A1 1/2003 Yap et al.
2003/0034873 A1 2/2003 Chase et al.
2003/0055727 A1 3/2003 Walker et al.
2003/0078882 A1 4/2003 Sukeda et al.
2003/0167350 A1 9/2003 Davis et al.
2003/0208449 A1 11/2003 Diao
2003/0220876 A1 11/2003 Burger
2004/0015958 A1 1/2004 Veil et al.
2004/0039919 A1 2/2004 Takayama et al.
2004/0127256 A1 7/2004 Goldthwaite et al.
2004/0215674 A1 10/2004 Odinak et al.
2004/0230799 A1 11/2004 Davis
2005/0044367 A1 2/2005 Gasparini et al.
2005/0075985 A1 4/2005 Cartmell
2005/0081038 A1 4/2005 Arditti Modiano et al.
2005/0138387 A1 6/2005 Lam et al.
2005/0149386 A1 * 7/2005 Agura .................... G06Q 30/02
705/14.33
2005/0156026 A1 7/2005 Ghosh et al.
2005/0160049 A1 7/2005 Lundholm
2005/0195975 A1 9/2005 Kawakita
2005/0228997 A1 10/2005 Bicker
2005/0247797 A1 11/2005 Ramachandran
2005/0269402 A1 12/2005 Spitzer
2006/0006230 A1 1/2006 Bear et al.
2006/0040726 A1 2/2006 Szrek et al.
2006/0041402 A1 2/2006 Baker
2006/0044153 A1 3/2006 Dawidowsky
2006/0047954 A1 3/2006 Sachdeva et al.
2006/0059253 A1 * 3/2006 Goodman .............. G06Q 10/10
709/223
2006/0085848 A1 4/2006 Aissi et al.
2006/0136334 A1 6/2006 Atkinson et al.
2006/0173985 A1 8/2006 Moore
2006/0174331 A1 8/2006 Schuetz
2006/0242698 A1 10/2006 Inskeep et al.
2006/0280338 A1 12/2006 Rabb
2007/0033642 A1 2/2007 Ganesan et al.
2007/0055630 A1 3/2007 Gauthier et al.
2007/0061266 A1 3/2007 Moore et al.
2007/0061487 A1 3/2007 Moore et al.
2007/0116292 A1 5/2007 Kurita et al.
2007/0118745 A1 5/2007 Buer
2007/0197261 A1 8/2007 Humbel
2007/0224969 A1 9/2007 Rao
2007/0241182 A1 10/2007 Buer
2007/0256134 A1 11/2007 Lehtonen et al.
2007/0258594 A1 11/2007 Sandhu et al.
2007/0276765 A1 11/2007 Hazel
2007/0278291 A1 12/2007 Rans et al.
2008/0008315 A1 1/2008 Fontana et al.
2008/0011831 A1 1/2008 Bonalle et al.
2008/0014867 A1 1/2008 Finn
2008/0035738 A1 2/2008 Mullen
2008/0071681 A1 3/2008 Khalid
2008/0072303 A1 3/2008 Syed
2008/0082452 A1 4/2008 Wankmueller
2008/0086767 A1 4/2008 Kulkarni et al.
2008/0099552 A1 5/2008 Grillion
2008/0103968 A1 5/2008 Bies et al.
2008/0109309 A1 5/2008 Landau et al.
2008/0110983 A1 5/2008 Ashfield
2008/0120711 A1 5/2008 Dispensa
2008/0156873 A1 7/2008 Wilhelm et al.
2008/0162312 A1 7/2008 Sklovsky et al.
2008/0164308 A1 7/2008 Aaron et al.
2008/0207307 A1 8/2008 Cunningham, II et al.
2008/0209543 A1 8/2008 Aaron
2008/0223918 A1 9/2008 Williams et al.
2008/0285746 A1 11/2008 Landrock et al.
2008/0308641 A1 12/2008 Finn
2009/0037275 A1 2/2009 Pollio
2009/0048026 A1 2/2009 French
2009/0132417 A1 5/2009 Scipioni et al.
2009/0143104 A1 6/2009 Loh et al.
2009/0171682 A1 7/2009 Dixon et al.
2009/0210308 A1 8/2009 Toomer et al.
2009/0235339 A1 9/2009 Mennes et al.
2009/0249077 A1 10/2009 Gargaro et al.
2009/0282264 A1 11/2009 Ameil et al.
2010/0023449 A1 1/2010 Skowronek et al.
2010/0023455 A1 1/2010 Dispensa et al.
2010/0029202 A1 2/2010 Jolivet et al.
2010/0033310 A1 2/2010 Narendra et al.
2010/0036769 A1 2/2010 Winters et al.
2010/0078471 A1 4/2010 Lin et al.
2010/0082486 A1 * 4/2010 Lee ...................... G06Q 20/322
455/411
2010/0082491 A1 4/2010 Rosenblatt et al.
2010/0094754 A1 4/2010 Bertran et al.
2010/0095130 A1 4/2010 Bertran et al.
2010/0100480 A1 4/2010 Altman et al.
2010/0114731 A1 5/2010 Kingston et al.
2010/0192230 A1 7/2010 Steeves et al.
2010/0205091 A1 * 8/2010 Graziano ............... G06Q 30/02
705/40
2010/0207742 A1 8/2010 Buhot et al.
2010/0211797 A1 8/2010 Westerveld et al.
2010/0240413 A1 9/2010 He et al.
2010/0257357 A1 10/2010 McClain
2010/0312634 A1 12/2010 Cervenka
2010/0312635 A1 12/2010 Cervenka
2011/0028160 A1 2/2011 Roeding et al.
2011/0035604 A1 2/2011 Habraken
2011/0060631 A1 3/2011 Grossman et al.
2011/0068170 A1 3/2011 Lehman
2011/0084132 A1 4/2011 Tofighbakhsh
2011/0101093 A1 5/2011 Ehrensvard
2011/0113245 A1 5/2011 Varadarajan
2011/0125638 A1 5/2011 Davis et al.
2011/0131415 A1 6/2011 Schneider
2011/0153437 A1 6/2011 Archer et al.

(56) References Cited

U.S. PATENT DOCUMENTS

2011/0153496 A1 6/2011 Royyuru
2011/0155801 A1 6/2011 Rowberry
2011/0208658 A1 8/2011 Makhotin
2011/0208965 A1 8/2011 Machani
2011/0211219 A1 9/2011 Bradley et al.
2011/0218911 A1 9/2011 Spodak
2011/0238564 A1 9/2011 Lim et al.
2011/0246780 A1 10/2011 Yeap et al.
2011/0258452 A1 10/2011 Coulier et al.
2011/0280406 A1 11/2011 Ma et al.
2011/0282785 A1 11/2011 Chin
2011/0294418 A1 12/2011 Chen
2011/0312271 A1 12/2011 Ma et al.
2012/0024947 A1 2/2012 Naelon
2012/0030047 A1 2/2012 Fuentes et al.
2012/0030121 A1 2/2012 Grellier
2012/0047071 A1 2/2012 Mullen et al.
2012/0079281 A1 3/2012 Lowenstein et al.
2012/0109735 A1 5/2012 Krawczewicz et al.
2012/0109764 A1 5/2012 Martin et al.
2012/0143703 A1 6/2012 Wall
2012/0143754 A1 6/2012 Patel
2012/0150737 A1 6/2012 Rottink et al.
2012/0178366 A1 7/2012 Levy et al.
2012/0196583 A1 8/2012 Kindo
2012/0207305 A1 8/2012 Gallo et al.
2012/0209773 A1 8/2012 Ranganathan
2012/0238206 A1 9/2012 Singh et al.
2012/0239560 A1 9/2012 Pourfallah et al.
2012/0252350 A1 10/2012 Steinmetz et al.
2012/0254394 A1 10/2012 Barras
2012/0284194 A1 11/2012 Liu et al.
2012/0290472 A1 11/2012 Mullen et al.
2012/0296818 A1 11/2012 Nuzzi et al.
2012/0316992 A1 12/2012 Oborne
2012/0317035 A1 12/2012 Royyuru et al.
2012/0317628 A1 12/2012 Yeager
2013/0005245 A1 1/2013 Royston
2013/0008956 A1 1/2013 Ashfield
2013/0026229 A1 1/2013 Jarman et al.
2013/0030997 A1 1/2013 Spodak
2013/0048713 A1 2/2013 Pan
2013/0054474 A1 2/2013 Yeager
2013/0065564 A1 3/2013 Conner et al.
2013/0080228 A1 3/2013 Fisher
2013/0080229 A1 3/2013 Fisher
2013/0099587 A1 4/2013 Lou et al.
2013/0104251 A1 4/2013 Moore et al.
2013/0106576 A1 5/2013 Hinman et al.
2013/0119130 A1 5/2013 Braams
2013/0130614 A1 5/2013 Busch-Sorensen
2013/0138565 A1* 5/2013 Dixon ...................... G06K 5/00
235/382
2013/0144793 A1 6/2013 Royston
2013/0146657 A1 6/2013 Graef
2013/0171929 A1 7/2013 Adams et al.
2013/0179351 A1 7/2013 Wallner
2013/0185772 A1 7/2013 Jaudon et al.
2013/0191279 A1 7/2013 Calman et al.
2013/0200999 A1 8/2013 Spodak et al.
2013/0211937 A1 8/2013 Elbirt
2013/0216108 A1 8/2013 Hwang et al.
2013/0226791 A1 8/2013 Springer et al.
2013/0226796 A1 8/2013 Jiang et al.
2013/0232082 A1 9/2013 Krawczewicz et al.
2013/0238894 A1 9/2013 Ferg et al.
2013/0282360 A1 10/2013 Shimota et al.
2013/0303085 A1 11/2013 Boucher et al.
2013/0304651 A1 11/2013 Smith
2013/0311363 A1 11/2013 Ramaci
2013/0312082 A1 11/2013 Izu et al.
2013/0314593 A1 11/2013 Reznik et al.
2013/0344857 A1 12/2013 Berionne et al.
2014/0002238 A1 1/2014 Taveau et al.
2014/0019352 A1 1/2014 Shrivastava
2014/0027506 A1 1/2014 Heo et al.
2014/0032409 A1 1/2014 Rosano
2014/0032410 A1 1/2014 Georgiev et al.
2014/0040120 A1 2/2014 Cho et al.
2014/0040139 A1 2/2014 Brudnicki et al.
2014/0040147 A1 2/2014 Varadarakan et al.
2014/0047235 A1 2/2014 Lessiak et al.
2014/0058938 A1* 2/2014 McClung, III ......... G06Q 20/36
705/41
2014/0067690 A1 3/2014 Pitroda et al.
2014/0074637 A1 3/2014 Hammad
2014/0074655 A1 3/2014 Lim et al.
2014/0081720 A1 3/2014 Wu
2014/0081785 A1 3/2014 Valadas Preto
2014/0138435 A1 5/2014 Khalid
2014/0171034 A1 6/2014 Aleksin et al.
2014/0171039 A1 6/2014 Bjontegard
2014/0172700 A1 6/2014 Teuwen et al.
2014/0180851 A1 6/2014 Fisher
2014/0208112 A1 7/2014 McDonald et al.
2014/0214674 A1 7/2014 Narula
2014/0229375 A1 8/2014 Zaytzsev et al.
2014/0245391 A1 8/2014 Adenuga
2014/0256251 A1 9/2014 Caceres et al.
2014/0258099 A1 9/2014 Rosano
2014/0258113 A1 9/2014 Gauthier et al.
2014/0258125 A1 9/2014 Gerber et al.
2014/0274179 A1 9/2014 Zhu et al.
2014/0279479 A1 9/2014 Maniar et al.
2014/0291395 A1* 10/2014 Wankmueller ........ G07F 7/1008
235/381
2014/0337235 A1 11/2014 Van Heerden et al.
2014/0339315 A1 11/2014 Ko
2014/0346860 A1 11/2014 Aubry et al.
2014/0365377 A1 12/2014 Salama
2014/0365780 A1 12/2014 Movassaghi
2014/0379361 A1 12/2014 Mahadkar et al.
2015/0012444 A1 1/2015 Brown et al.
2015/0032635 A1 1/2015 Guise
2015/0071486 A1 3/2015 Rhoads et al.
2015/0073983 A1 3/2015 Bartenstein
2015/0088757 A1 3/2015 Zhou et al.
2015/0089586 A1 3/2015 Ballesteros
2015/0113271 A1 4/2015 Jooste
2015/0134452 A1 5/2015 Williams
2015/0134513 A1 5/2015 Olson
2015/0140960 A1 5/2015 Powell et al.
2015/0154595 A1 6/2015 Collinge et al.
2015/0170138 A1 6/2015 Rao
2015/0178724 A1 6/2015 Ngo et al.
2015/0186871 A1 7/2015 Laracey
2015/0199673 A1 7/2015 Savolainen
2015/0199863 A1 7/2015 Scoggins
2015/0205379 A1 7/2015 Mag et al.
2015/0254637 A1 9/2015 Yang
2015/0302409 A1 10/2015 Malek et al.
2015/0317295 A1 11/2015 Sherry
2015/0317626 A1 11/2015 Ran et al.
2015/0332266 A1 11/2015 Friedlander et al.
2015/0339474 A1 11/2015 Paz et al.
2015/0371234 A1 12/2015 Huang et al.
2016/0012465 A1 1/2016 Sharp
2016/0026997 A1 1/2016 Tsui et al.
2016/0048913 A1 2/2016 Rausaria et al.
2016/0055480 A1 2/2016 Shah
2016/0057619 A1 2/2016 Lopez
2016/0065370 A1 3/2016 Le Saint et al.
2016/0078430 A1 3/2016 Douglas
2016/0087957 A1 3/2016 Shah et al.
2016/0092696 A1 3/2016 Guglani et al.
2016/0148177 A1* 5/2016 Best ................... G06Q 20/0855
705/65
2016/0148193 A1 5/2016 Kelley et al.
2016/0189143 A1 6/2016 Koeppel
2016/0232523 A1 8/2016 Venot et al.
2016/0232527 A1* 8/2016 Patterson ............. G06Q 20/405
2016/0239672 A1 8/2016 Khan et al.
2016/0253651 A1 9/2016 Park et al.
2016/0255072 A1 9/2016 Liu

(56) References Cited

U.S. PATENT DOCUMENTS

| | | | | |
|---|---|---|---|---|
| 2016/0267486 | A1 | 9/2016 | Mitra et al. | |
| 2016/0277383 | A1 | 9/2016 | Guyomarc'h et al. | |
| 2016/0277388 | A1 | 9/2016 | Lowe et al. | |
| 2016/0307187 | A1 | 10/2016 | Guo et al. | |
| 2016/0307189 | A1 | 10/2016 | Zarakas et al. | |
| 2016/0314472 | A1 | 10/2016 | Ashfield | |
| 2016/0330027 | A1 | 11/2016 | Ebrahimi | |
| 2016/0335531 | A1 | 11/2016 | Mullen et al. | |
| 2016/0379217 | A1 | 12/2016 | Hammad | |
| 2017/0004502 | A1 | 1/2017 | Quentin et al. | |
| 2017/0011395 | A1 | 1/2017 | Pillai et al. | |
| 2017/0011406 | A1 | 1/2017 | Tunnell et al. | |
| 2017/0017957 | A1 | 1/2017 | Radu | |
| 2017/0017964 | A1 | 1/2017 | Janefalkar et al. | |
| 2017/0024716 | A1 | 1/2017 | Jiam et al. | |
| 2017/0039566 | A1 | 2/2017 | Schipperheijn | |
| 2017/0041759 | A1 | 2/2017 | Gantert et al. | |
| 2017/0068950 | A1 | 3/2017 | Kwon | |
| 2017/0103388 | A1 | 4/2017 | Pillai et al. | |
| 2017/0104739 | A1 | 4/2017 | Lansler et al. | |
| 2017/0109509 | A1 | 4/2017 | Baghdasaryan | |
| 2017/0109730 | A1 | 4/2017 | Locke et al. | |
| 2017/0116447 | A1 | 4/2017 | Cimino et al. | |
| 2017/0124568 | A1 | 5/2017 | Moghadam | |
| 2017/0140379 | A1 | 5/2017 | Deck | |
| 2017/0154328 | A1 | 6/2017 | Zarakas et al. | |
| 2017/0154333 | A1 | 6/2017 | Gleeson et al. | |
| 2017/0180134 | A1 | 6/2017 | King | |
| 2017/0230189 | A1 | 8/2017 | Toll et al. | |
| 2017/0237301 | A1 | 8/2017 | Elad et al. | |
| 2017/0289127 | A1 | 10/2017 | Hendrick | |
| 2017/0295013 | A1 | 10/2017 | Claes | |
| 2017/0316696 | A1 | 11/2017 | Bartel | |
| 2017/0317834 | A1 | 11/2017 | Smith et al. | |
| 2017/0330173 | A1 | 11/2017 | Woo et al. | |
| 2017/0372275 | A1 * | 12/2017 | Sigmund | G06Q 20/403 |
| 2017/0374070 | A1 | 12/2017 | Shah et al. | |
| 2018/0034507 | A1 | 2/2018 | Wobak et al. | |
| 2018/0039986 | A1 | 2/2018 | Essebag et al. | |
| 2018/0039987 | A1 | 2/2018 | Molino | |
| 2018/0068316 | A1 | 3/2018 | Essebag et al. | |
| 2018/0129945 | A1 | 5/2018 | Saxena et al. | |
| 2018/0160255 | A1 | 6/2018 | Park | |
| 2018/0191501 | A1 | 7/2018 | Lindemann | |
| 2018/0205712 | A1 | 7/2018 | Versteeg et al. | |
| 2018/0240106 | A1 | 8/2018 | Garrett et al. | |
| 2018/0254909 | A1 | 9/2018 | Hancock | |
| 2018/0268132 | A1 | 9/2018 | Buer et al. | |
| 2018/0270214 | A1 | 9/2018 | Caterino et al. | |
| 2018/0294959 | A1 | 10/2018 | Traynor et al. | |
| 2018/0300716 | A1 | 10/2018 | Carlson | |
| 2018/0302396 | A1 | 10/2018 | Camenisch et al. | |
| 2018/0315050 | A1 | 11/2018 | Hammad | |
| 2018/0316666 | A1 | 11/2018 | Koved et al. | |
| 2018/0322486 | A1 | 11/2018 | Deliwala et al. | |
| 2018/0359100 | A1 | 12/2018 | Gaddam et al. | |
| 2019/0014107 | A1 | 1/2019 | George | |
| 2019/0019375 | A1 | 1/2019 | Foley | |
| 2019/0036678 | A1 | 1/2019 | Ahmed | |
| 2019/0172055 | A1 | 6/2019 | Hale | |
| 2019/0238517 | A1 | 8/2019 | D'Agostino et al. | |
| 2019/0303945 | A1 | 10/2019 | Mitra | |
| 2021/0004806 | A1 | 1/2021 | Noe | |
| 2021/0209582 | A1 * | 7/2021 | Paliwal | G06F 21/31 |
| 2021/0272098 | A1 | 9/2021 | Delsuc | |
| 2021/0304189 | A1 | 9/2021 | Gupta | |
| 2021/0383360 | A1 | 12/2021 | Sinha | |
| 2021/0406869 | A1 | 12/2021 | Pathrabe | |
| 2022/0114581 | A1 | 4/2022 | Upadhye | |
| 2022/0207517 | A1 * | 6/2022 | Wyatt | G06Q 20/065 |
| 2022/0284416 | A1 | 9/2022 | Rule | |
| 2022/0309509 | A1 | 9/2022 | Akgun | |
| 2022/0335412 | A1 | 10/2022 | Rule | |
| 2022/0366410 | A1 | 11/2022 | Rule | |
| 2022/0398566 | A1 | 12/2022 | Rule | |
| 2022/0414648 | A1 | 12/2022 | Rule | |
| 2023/0054157 | A1 | 2/2023 | Mao | |
| 2023/0065163 | A1 | 3/2023 | Vargas | |
| 2023/0083785 | A1 | 3/2023 | Maiman | |
| 2023/0169505 | A1 | 6/2023 | Rule | |
| 2023/0354020 | A1 | 11/2023 | Rule | |
| 2023/0359839 | A1 | 11/2023 | Lovgren | |

FOREIGN PATENT DOCUMENTS

| | | | | |
|---|---|---|---|---|
| CN | 103023643 | A | 4/2013 | |
| CN | 103417202 | A | 12/2013 | |
| EP | 1085424 | A1 | 3/2001 | |
| EP | 1223565 | A1 | 7/2002 | |
| EP | 1265186 | A2 | 12/2002 | |
| EP | 1467330 | A2 * | 10/2004 | G06Q 30/04 |
| EP | 1783919 | A1 | 5/2007 | |
| EP | 2139196 | A1 | 12/2009 | |
| EP | 1469419 | A1 | 8/2012 | |
| EP | 2852070 | A1 | 3/2015 | |
| GB | 2457221 | A | 8/2009 | |
| GB | 2516861 | A | 2/2015 | |
| GB | 2551907 | A | 1/2018 | |
| KR | 101508320 | B1 | 4/2015 | |
| KR | 20150140132 | A | 12/2015 | |
| WO | WO-9858339 | A1 * | 12/1998 | G06Q 20/14 |
| WO | 9910824 | A1 | 3/1999 | |
| WO | 0049586 | A1 | 8/2000 | |
| WO | 2006070189 | A2 | 7/2006 | |
| WO | 2008055170 | A2 | 5/2008 | |
| WO | 2009025605 | A2 | 2/2009 | |
| WO | 2010049252 | A1 | 5/2010 | |
| WO | 2011112158 | A1 | 9/2011 | |
| WO | 2012001624 | A1 | 1/2012 | |
| WO | WO-2012170303 | A1 * | 12/2012 | G06Q 20/20 |
| WO | 2013039395 | A1 | 3/2013 | |
| WO | 2013155562 | A1 | 10/2013 | |
| WO | 2013192358 | A2 | 12/2013 | |
| WO | 2014043278 | A1 | 3/2014 | |
| WO | 2014170741 | A2 | 10/2014 | |
| WO | 2015179649 | A1 | 11/2015 | |
| WO | 2015183818 | A1 | 12/2015 | |
| WO | 2016097718 | A1 | 6/2016 | |
| WO | 2016160816 | A1 | 10/2016 | |
| WO | 2016168394 | A1 | 10/2016 | |
| WO | 2017042375 | A1 | 3/2017 | |
| WO | 2017042400 | A1 | 3/2017 | |
| WO | 2017047855 | A1 | 3/2017 | |
| WO | 2017157859 | A1 | 9/2017 | |
| WO | 2017208063 | A1 | 12/2017 | |
| WO | 2018063809 | A1 | 4/2018 | |
| WO | 2018137888 | A1 | 8/2018 | |
| WO | 2019022585 | A1 | 1/2019 | |
| WO | 2021051884 | A1 | 3/2021 | |
| WO | 2021133492 | A1 | 7/2021 | |
| WO | 2022108959 | A1 | 5/2022 | |
| WO | 2022187350 | A1 | 9/2022 | |
| WO | 2023017943 | A1 | 2/2023 | |
| WO | 2023064063 | A1 | 4/2023 | |

OTHER PUBLICATIONS

• European Payments Council. "White Paper Mobile Wallet Payments." (Jan. 21, 2014). Retrieved online Jun. 6, 2025. https://www.europeanpaymentscouncil.eu/sites/default/files/KB/files/EPC163-13%20v2.0%20White%20Paper%20Mobile%20Wallet%20Payments.pdf (Year: 2014).*

• Visa. "Transaction Acceptance Device Guide (TADG)." (Nov. 2016). Retrieved online Jun. 6, 2025. https://www.visa.com.pe/dam/VCOM/regional/na/us/partner-with-us/documents/transaction-acceptance-device-guide-tadg.pdf (Year: 2016).*

The International Search Report and Written Opinion mailed Jul. 16, 2024, for corresponding PCT/US24/23689, eight (8) pages).

Batina, L. and Poll, E., "SmartCards and RFID", Course PowerPoint Presentation for IPA Security Course, Digital Security at University of Nijmegen, Netherlands (date unknown) 75 pages.

(56) References Cited

OTHER PUBLICATIONS

Haykin, M. and Warnar, R., "Smart Card Technology: New Methods for Computer Access Control", Computer Science and Technology NIST Special Publication 500-157:1-60 (1988).
Lehpamer, H., "Component of the RFID System", RFID Design Principles, 2nd edition pp. 133-201 (2012).
Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018-11-13]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on 2019-03-25]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on 2019-03-25]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).

(56) References Cited

OTHER PUBLICATIONS

Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Mar. 27, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

SYSTEMS AND METHODS FOR PROVISIONING TRANSACTION CARDS TO MULTIPLE MERCHANTS

BACKGROUND

Consumers may store or register payment cards with various merchants. The registered payment cards may be automatically retrieved to process a purchase by a consumer to make the transaction more efficient, secure, and/or to provide other benefits to the consumer. For example, a consumer may have an online account with an e-commerce retailer. The online account may store personal information as well as payment information, such as credit card information sufficient to process a payment. When the consumer makes a purchase, the credit card information may be automatically retrieved and applied as a payment source (responsive to confirmation by the consumer).

A typical consumer may have a payment card registered with multiple merchants. For example, a single credit card may be stored as a payment source at an e-commerce retailer, a grocery store, and for automatic bill payment (for instance, with an electricity service provider, a gym membership, a media streaming membership, and/or the like). If the user obtains a new payment card that they prefer to use in place of the previous credit card, they are required to update the payment information with each individual account, vendor, etc. Using conventional technologies, updating the payment source at multiple merchants is a tedious and time-consuming process that is also error prone due to the manual data entry of the payment card information. In addition, manual updating of payment card information is an unsecure process in which the card owner is vulnerable unauthorized access to their information. Accordingly, consumers would benefit from a more secure, efficient, and easier process for managing payment information at multiple merchants.

SUMMARY

Systems, methods, apparatuses, and computer-readable media for provisioning transaction cards with multiple merchants are described.

In one embodiment, a computer-implemented method may include receiving, at a financial institution server from a user device, a plurality of payment card number requests, wherein a respective payment card number request is received for each merchant website of a plurality of merchant websites; sending an authentication request to the user device, wherein the authentication request is a request for the user device to interact with a contactless payment card associated with a user financial institution account; receiving, from the user device, encrypted authentication information received from the contactless payment card in response to the authentication request; authenticating the encrypted authentication information received from the user device; based on the authenticating being successful, granting respective tokens to each respective merchant of the plurality of merchants, wherein each respective token of the granted respective tokens identifies a respective communication session established with each respective merchant and enables a continued exchange of data with each respective merchant; and using each respective token to identify the respective communication session established with each respective merchant, providing account information as needed to each respective merchant to associate a respective merchant account with a user of the contactless payment card.

In some embodiments of the method, a last payment card number request of the plurality of payment card number requests may be received within a predetermined time period.

In various embodiments of the method, the predetermined time period may be determined based on a time of a receipt of a first payment card number request of the plurality of payment card number requests.

In some embodiments of the method, the predetermined time period may be about 5 minutes, about 10 minutes, or about 20 minutes.

In exemplary embodiments of the method, receiving the plurality of payment card number requests may include establishing a secure connection with the user device.

In various embodiments of the method, the secure connection may be established based on identifying information of the user of the contactless payment card.

In some embodiments of the method, the identifying information may be received prior to receiving a first payment card number request of the plurality of payment card number requests.

In various embodiments of the method, authenticating the encrypted authentication information received from the user device may include decrypting the encrypted authentication information; and confirming information input from the user device corresponds with the decrypted authentication information accessible by the financial institution server.

In exemplary embodiments of the method, authenticating the encrypted authentication information received from the user device may include, upon successful confirmation, generating an authorization to grant the respective tokens for each payment card number request of the plurality of payment card number requests.

In one embodiment, a computer-implemented method may include, receiving, at a financial institution server from a user device, a first payment card number request from a first merchant of a plurality of merchants to associate user financial institution account information with a first merchant account; sending a contactless payment card step-up authentication request to the user device, wherein the contactless payment card step-up authentication request is a request for the user device to interact with a contactless payment card associated with the user financial institution account information; receiving, from the user mobile, device encrypted authentication information maintained on the contactless payment card in response to the contactless payment card step-up request; authenticating the encrypted authentication information received from the user device; and based on the authenticating being successful, granting a first token to the first merchant, wherein the first token identifies a communication session with the first merchant and enables a continued exchange of data with the first merchant.

In some embodiments of the method, the method may include using the token to identify the communication session, providing account information as needed for the first merchant to populate the first merchant account.

In various embodiments of the method, the method may further include receiving a second payment card number request from a second merchant; based on the authenticating being successful, granting a second token to the second merchant, the second token identifies a communication session with the second merchant and may enable a continued exchange of data of user financial institution account data with the second merchant.

In exemplary embodiments of the method, the token may enable retrieval of data by each merchant of the plurality of merchants.

In various embodiments of the method, the user financial institution account information may include a payment card number of a user of the user device and payment card number-related information.

In one embodiment, a non-transitory computer-readable storage medium may include instructions that when executed by a processor, cause the processor to: receive, from a user device, a plurality of payment card number requests, wherein a respective payment card number request is received for each merchant website of a plurality of merchant websites; send a contactless payment card step-up authentication request to the user device, wherein the contactless payment card step-up authentication request is a request for the user device to interact with a contactless payment card associated with a user financial institution account; receive, from the user device, encrypted authentication information obtained from the contactless payment card in response to the contactless payment card step-up request; authenticate the encrypted authentication information received from the user device; based on the authenticating being successful, grant respective tokens to each respective merchant of the plurality of merchants, wherein each respective token of the granted respective tokens identifies a respective communication session established with each respective merchant and enables a continued exchange of data with each respective merchant; and using each respective token to identify the respective communication session established with each respective merchant, provide account information as needed to each respective merchant to associate a respective merchant account with a user of the contactless payment card.

In some embodiments of the computer-readable storage medium, a last payment card number request of the plurality of payment card number requests may be received within a predetermined time period.

In various embodiments of the computer-readable storage medium, the predetermined time period may be determined based on a time of a receipt of a first payment card number request of the plurality of payment card number requests.

In some embodiments of the computer-readable storage medium, the predetermined time period may be about 5 minutes, about 10 minutes, or about 20 minutes.

In exemplary embodiments of the computer-readable storage medium, receiving the plurality of payment card number requests, the processor may be operable to establish a secure connection with the user device based on identifying information of the user received prior to receiving a first payment card number request of the plurality of payment card number requests.

In various embodiments of the computer-readable storage medium, authenticating the encrypted authentication information received from the user device may include: decrypting the encrypted authentication information; confirming information input from the user device corresponds with the decrypted authentication information; and upon successful confirmation, generating an authorization to grant the respective tokens for each payment card number request of the plurality of payment card number requests.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
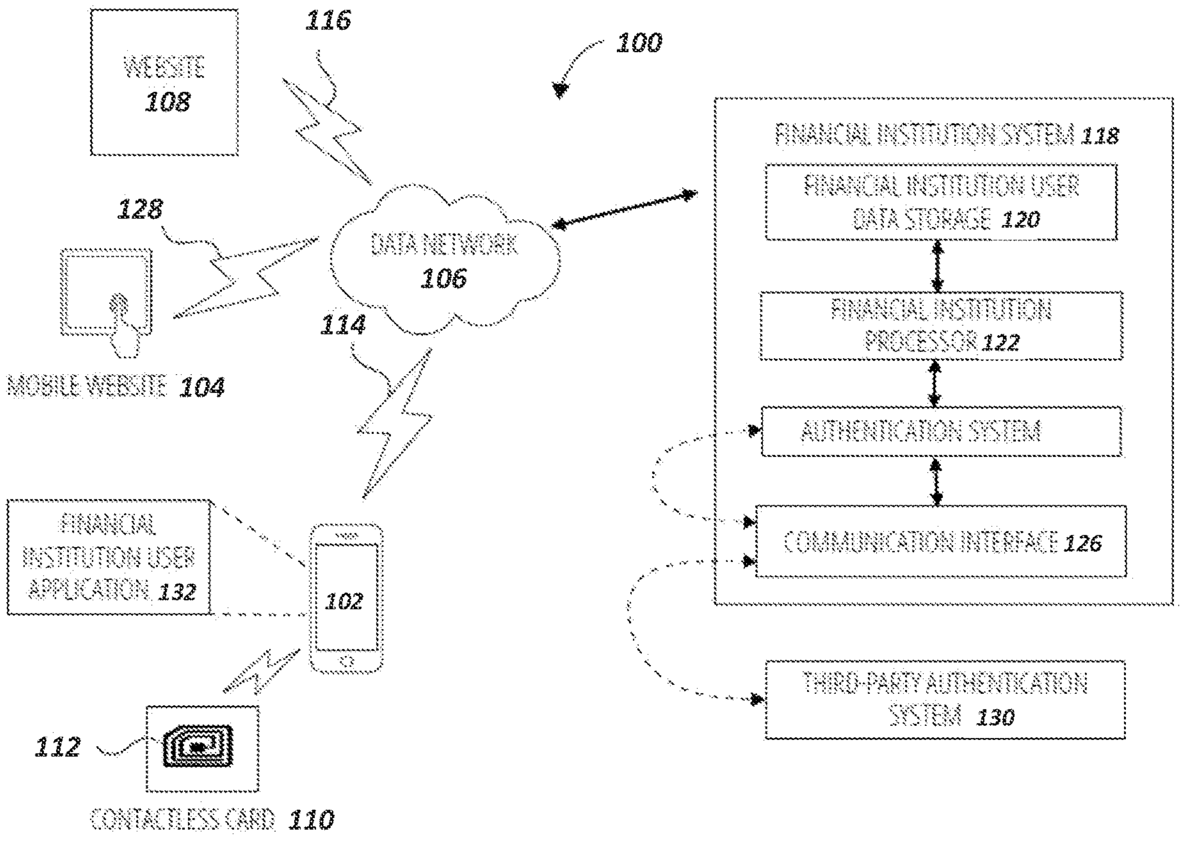
FIG. 1 depicts an exemplary operating environment in accordance with the present disclosure.

For the purposes of promoting an understanding of the principles of the present disclosure, reference will now be made to the embodiments illustrated in the figures and specific language will be used to describe the same. It will nevertheless be understood that no limitation of the scope of the disclosure is thereby intended. Any alterations and further modifications in the described embodiments, and any further applications of the principles of the present disclosure as described herein are contemplated as would normally occur to one skilled in the art to which the disclosure relates.

The described technologies generally relate to systems and methods for provisioning transaction cards to multiple entities. In some embodiments, the transaction card may be a payment card, credit card, debit card, gift card, and/or the like. In various embodiments, the transaction card may be a contactless card (see, for example, FIGS. 6-13). Non-limiting examples of entities may include merchants, retailers, vendors, shopping clubs, membership organizations (e.g., co-operatives, gyms, and/or the like), e-commerce platforms, and/or the like. Although the example of a merchant entity may be used in the present disclosure, embodiments are not so limited, as the described technology may be used in relation to various different types of entities.

A user may have a registered account with an entity (an "entity account") (e.g., Kroger®, Amazon®, Sam's Club®, Walmart®, Target®, and/or the like). The registered account may include personal information (e.g., name, address, demographic information, preferences, and/or the like) and payment information. In various embodiments, the payment information may be or may include information of a transaction card, such as a credit card, that may be applied to pay for purchases. The transaction card information may include, without limitation, card owner name, card owner address, card number, expiration date, card verification value (CVV), and/or the like. The registered account may allow the user to perform transactions with the entity via an online platform (e.g., retailer e-commerce site, mobile application ("app"), and/or the like) and/or in a physical retail location using the stored payment information. In this manner, a user may use the information stored in the account to automatically select a payment card to process a payment without having to access the physical card.

With existing systems, each time that a user wants to use a new transaction card with one or more entities, the user is required to manually update the account information with each individual entity. Updating the payment source at multiple entities is a tedious and time-consuming process that is also error prone due to the manual data entry of the payment card information. In addition, manual updating of payment card information is an unsecure process in which the card owner is vulnerable unauthorized access to their information. Therefore, when a user obtains a new transaction card, such as a credit card or debit card, the user must proceed through the onerous and unsecure process of updating the payment information with each individual entity.

Accordingly, some embodiments provide methods and systems to facilitate provisioning a transaction card to multiple different and unrelated entities (e.g., "third party entities") via a single process through one access point.

In some embodiments, for example, a user may access an account via a transaction platform (e.g., a website, application, app, and/or the like) of a financial services provider that manages the financial services functions of the transaction card. Non-limiting examples of financial services companies may include a bank, a credit union, a credit card company, a government organization (for instance, an organization that issues government-managed payment cards), and/or the like. In one non-limiting example, the financial services provider may be Capital One Financial Corporation ("Capital One") of McLean, Virginia, United States of America (i.e., the transaction card issuer). The financial services platform configured according to some embodiments may allow a user to specify which entity accounts should be associated with a transaction card. The financial services platform may push this information to the entity accounts operated by third-party entity systems using processes configured according to some embodiments. In this manner, a financial services platform operating according to various embodiments may allow a user to update payment information at a plurality of entities through a single access point in an efficient, accurate, and secure process.

In one illustrative and non-restrictive example, the financial services provider may set up an authorization relationship with various entities. An example of an authorization relationship may be or may include an "open authorization" or "OAuth" relationship. In general, an OAuth relationship is an open-standard authorization protocol or framework that specifies how unrelated services can safely allow authenticated access to their assets without actually sharing a single logon credential. One example OAuth implementation is the OAuth 2.0 standard for open delegation established by the Internet Engineering Task Force (IETF). The OAuth 2.0 standard enables an access token to be issued to a third-party client by an authorization server, with the approval of the resource owner. The third party then uses the access token to access the protected resources hosted by the resource server. The access token is limited to being valid for a short period of time, such as about 5 minutes, about 10 minutes, about 20 minutes, and/or the like. Although OAuth is used as an example of an authorization relationship in the present disclosure, embodiments are not so limited, as any authorization relationship that may operate according to some embodiments is contemplated herein.

The authorization relationship may allow the third-party entity (e.g., an e-commerce platform) to accept or trust the financial service company's (e.g., Capital One's) authentication and step up to authorize access to putting a new card on file with the user's third-party entity account (i.e., the user's e-commerce platform account with the third-party entity). Once the authorization relationship is setup, the user may login to and perform an authentication (e.g., a step-up authentication) with the financial services provider platform (e.g., an application interface for the credit card). Using a validation process (for instance, contactless card authentication (see, for example, FIGS. 6-13), step-up authentication, multi-factor authentication, SMS one time password (OTP), driver's license validation, and/or the like) the user may authorize the financial services provider to put a card on file with the backend services of the third-party entities. The user may select which third-party entities may have their account records updated to include the card (including replacing an existing card). In some embodiments, the financial services provider may use past transactions to determine which merchants to present to the customer. For example, if the user has used the credit card with Merchant A and Merchant B, the user may be presented with an option to confirm pushing the new credit card information to the platforms of Merchant A and Merchant B.

In some embodiments, the authorization relationship, such as OAuth, may be respected by the third-party entity systems such that the financial services provider backend and the third-party entity backend may communicate various items of information to the third-party entity, such as account numbers, a primary account number (PAN), virtual account number (VCN) (including a locked VCN), personally identifiable information (PII) data (e.g., name, address, phone number, email, and/or the like).

In some embodiments, the process for updating transaction card information via a financial services provider platform may operate using existing third-party entity accounts of the credit card user. In various embodiments, the financial services platform may operate to create a new account with the transaction card information.

FIG. 1 depicts an exemplary operating environment in accordance with the present disclosure. The operating environment (or system) 100 may include a financial institution system 118, website 108, a mobile website 104, a mobile device 102, a contactless card 110 and a data network 106.

The data network 106 may be a network, such as the internet, a wide area network, a local area network, a metropolitan area network, a cellular network, a combination of networks, or the like, that enables different devices and systems communicate with one another.

The website 108 and the mobile website 104 may be services executing on servers or cloud platforms that provide services or products from service providers or merchants.

The financial service provider (or financial institution) system 118 may be provided by an entity, such as a bank, mortgage company, investment firm, credit card issuer, financial services provider (e.g., Capital One), and/or the like, and the entity be referred to herein after as a "financial institution" or "financial services provider." The financial institution may have business relationships with a number of third-party entities (or "merchants"). The number of merchants may include merchants that conduct business through online businesses, that sell merchandise and/or services through online transactions made possible by websites, such as website 108 and mobile website 104. In addition, or alternatively, the financial institution may have business relationships with a number of consumers that interact with the financial institution system 118 via their mobile devices, such as mobile device 102. As part of the relationship with the consumer, the financial institution may provide the consumer after a sufficient amount of vetting (to confirm identity, physical address, income, household members, account information and the like) with a contactless card 110.

The contactless card 110 as described in later examples (see for example, FIGS. 6-13) may be operable to provide encrypted authentication information that is authenticatable by the financial institution system 118. The contactless card 110 may be equipped with a near-field communication (NFC) device 112. The NFC device 112 may be operable to communicate with an NFC device (not shown in this example) in the mobile device 102.

The mobile device 102 may be operable to communicate with the financial institution system 118 via a communication link 114. The mobile device 102 may be operable to provide information obtained from the contactless card 110 to the financial institution system 118 via an instance of the user application 132. The user application 132 may be an application that facilitates obtaining the encrypted authentication information from the contactless card 110.

The financial institution system 118 may include a number of systems, memories, modules and components, such as a user data storage 120, a financial institution processor 122, an authentication system 124 and a communication interface 126.

The communication interface 126 may be operable to facilitate communication by the financial institution system 118 with the mobile device 102, the mobile website 104, and/or website 108 via the data network 106. The communication link 128 may couple the mobile website 104 to the data network 106. Similarly, the communication interface 126 may be operable to receive information from each of the mobile device 102, the mobile website 104 and the website 108 sent through the data network 106. The communication interface 126 may communicate via the data network 106 using known communication protocols.

The user data storage 120 may securely maintain information regarding the user that is used by the authentication system 124 to authenticate the user. For example, the maintained information regarding the user may include personal identifying information (PII), such as the user's name, home address, spousal information, telephone numbers, bank loan balances, types of accounts, types of automobiles secured by loans, mobile phone identifier (e.g., International Mobile Equipment Identity (IMEI) number or the like), passwords, permanent account numbers, past virtual account numbers, a transaction count and the like.

The financial institution processor 122 may be operable to receive the encrypted information, which may also be referred to as an encrypted authentication payload of the contactless card 110, from the communication interface 126. The financial institution processor 122 may be operable to process the encrypted information and forward encrypted authentication information to the authentication system 124.

The authentication system 124 may be a component (e.g., a processor, software, a combination of both) that decrypts (if needed) and/or authenticates information provided by a user, such as an identifier provided by the user to the website 108, authentication information from the contactless card 110, and the like. For example, the authentication system 124 may be a component that utilizes decryption algorithms to decrypt the encrypted authentication information and evaluate the decrypted to authentication information to user information obtained from the user data storage 120. Optionally, the authentication system 124 may interface with a third-party authentication system 130, which may provide some or all of the same functionality of the authentication system 124.

A customer may enter an identifier into a field of a web page presented by the web browser (such as a phone identifier, an email address, a permanent account number (PAN), or the like). For example, the user may enter the first 5 digits of the PAN, which provides the mobile website 104 with enough information to identify the user's financial institution. The identifier may include other additional information, such as a special keyword, an account number or name maintained in relation to the website 108 or mobile website 104, or the like that indicates to the website 108 and or mobile website 104. Alternatively, the user may select a financial institution presented on the web page of the website 108 and or mobile website 104 for use in the authentication process.

The website 108 may be operable to identify the user as a user in a centralized database or bank identification number. In a detailed example, the website 108 may have relationships with a number of different financial institutions and/or merchants. When the website 108 receives a user's identifying information, such as the phone identifier or email address, the website 108 may broadcast that information to all of the number of different financial institutions with which the website 108 has relationships. The first financial institution that responds with a confirmation is the one with which the website 108 will continue to conduct the transaction session with the first responding financial institution. The mobile website 104 may be operable to be presented and operate on mobile devices, such as a smartphone, laptop, tablet device or the like, and to function in a similar manner as the website 108.

The foregoing system 100 may be operable to provide the secure authentication of the user and streamlined secure transactions as outlined in the following process examples.

A customer may be asked to tap a contactless card to phone for a background read of authentication information usable by the financial institution to authenticate the user. In some examples, the present disclosure refers to a "tap" of the contactless card. However, it is understood that the present disclosure is not limited to a tap, and that the present disclosure includes other gestures (e.g., a wave or other movement of the card). The authentication information read by the phone may be a uniform resource locator (URL) (also referred to as a "link") associated with the financial institution. The URL may contain an encrypted payload which is authenticated by an authentication system 124 of the financial institution system 118. Alternatively, the authentication of the user may also serve as an approval of the transaction, in which case, any account information or the like needed by the merchant to complete the transaction at the website 108 may be provided by the financial institution and a notification that the transaction is completed may be presented by the user.

Financial institution system 118 sends authentication response to a merchant along with rest of personal identifiable information (PII) data and possibly a virtual card number (VCN), which may be a 15- or 16-digit number like a credit card number but without the physical credit card being present.

Essentially, the user merely provides their identifier (email address or telephone number) and taps a contactless card 110 to the mobile device 102, and upon authentication, the information (e.g., PII data, most frequent shipping address, and the like) for completing the transaction may be provided to the merchant.

The request to tap card to phone may cause the launch of a web browser on either a portable device presenting the mobile website 104 or a computing device that presents the website 108. For example, the financial institution may also generate a request to tap alert (e.g., a prompt) on their phone via an in-app notification or via SMS to initiate an authentication process as discussed herein. When the website 108 generates a browsing session for the user transaction, the browsing session is assigned a browsing session identifier. Information input during the browsing session, such as user's name, the shipping address, product identifiers that identify products to be purchased, and the like are saved with reference to the browsing session identifier. The browsing session identifier allows the merchant to quickly reconvene the user's shopping experience. A link containing the browsing session identifier may be provided with the authentication request to the financial institution. Upon authentication by the financial institution system, the user may resume the commerce session at the website 108 or mobile website 104. For example, the authentication result may be delivered by the authentication system 124 or the like of the financial institution system 118 and may include the browsing session identifier and information regarding the user. The browsing session may be a secure or encrypted communication link. The information regarding the user provided by the authentication system 124 may include the user's name, user's shipping address, user's contact information, and the like.

In an example, the encrypted authentication payload is sent in URL to financial institution backend, which is expecting the payload in a message for authentication. Encrypted authentication payload may include version number (if multiple versions), unique identifier of person, application transaction counter, one-time password, and a cryptogram that is used to validate message integrity. For example, a URL message may be structured as "www.financialinstitutionname.com/fintech 1?AUTHENTICATION MESSAGE" or the like. Upon receipt of the URL message, the OS of the mobile device may be operable to contact the financial institution at the URL and provide the AUTHENTICATION MESSAGE to the financial institution system 118. The financial institution system 118 associated with the URL may be operable to take the AUTHENTICATION MESSAGE and authenticate the user, determine if there is a pending transaction (for example, based on the earlier notification from the website 108) and provide the needed information to complete the transaction. Alternatively, the URL message may be processed by the OS of the mobile device to be sent as a text message to the financial institution system, which may be operable to access the URL in the message. The information usable to complete the transaction may be provided in an authentication response to merchant that includes some additional PII data (that may not have already been input to the website 108 by the user) and possibly a virtual card number (VCN).

Figure 2:
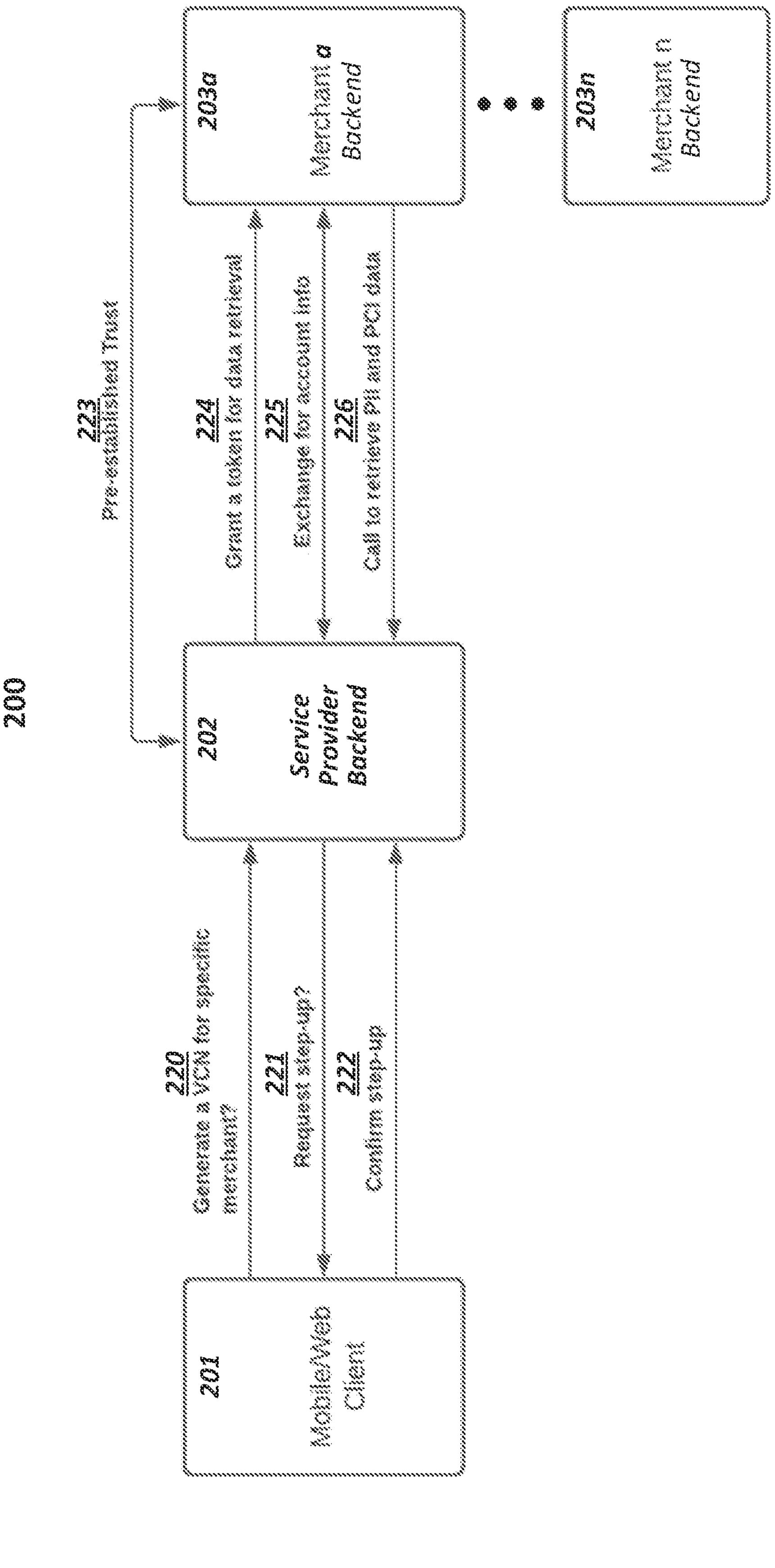
FIG. 2 depicts an exemplary operating environment in accordance with the present disclosure.

FIG. 2 depicts an exemplary operating environment in accordance with the present disclosure. As shown in FIG. 2, an operating environment 200 may include mobile/web client (e.g., a user device) 201, a service provider (e.g., a financial services provider) backend 202, and a plurality of third-party entity (or merchant) backends 203*a-n*. In some embodiments, the operating environment 100 may provide a system configured to provision a transaction card to a plurality of merchants via a single access point (for instance, an application executed on a user device, such as an app operating on a user smartphone), such as via client device 201. In various embodiments, the client device 201 may have a financial services provider application installed thereon for interacting with the financial services provider (or the financial services provider backend 202).

In some embodiments, a service provider backend (e.g., server(s)) 202 may establish a trust relationship with the backend platform of one or more merchants 203*a-n*. In one non-limiting example, the trust relationship may be or may include an authorization relationship, such as an OAuth relationship. The authorization relationship between the financial services provider and the merchants may be determined according to various processes. For example, the authorization relationship may be established via a contractual relationship, or a program offered to the merchants by the financial services provider. In general, the authorization process may include a process, system, etc. for merchants to trust the authentication programs and processes of the financial services provider (and/or vice versa) and allow the financial services provider to put their users and/or user's transaction card on file (e.g., add as a payment option in the user's merchant account).

In some embodiments, a user via a client device 201 may request 220 (for instance, a payment card number request) that a transaction card be set up with a merchant. For example, in response to accessing a transaction account with financial services provider backend 202, a user may be provided with an option or prompt to associate the transaction card with a third-party entity. In another example, for a contactless card (see, for example, FIGS. 6-13), tapping the card to the client device 201 may allow for selection or may elicit a prompt to add the card to a third-party entity.

In various embodiments, the request 220 may include generating a VCN to be used with a specific merchant (or set of merchants). The financial services provider backend 202 may receive the request 220 and request 221 authentication. For example, the request 221 may be the financial services provider using multi-factor authentication, step-up authentication, and/or the like for the user to authenticate themselves on the client device 201. For instance, a user may initiate a transaction on a website or app, but the financial services provider may seek to ensure the identity of the user, so the financial services provider may request 221 that the user authenticate themselves on the client device 201 that already has the financial services provider app installed. The financial services provider may have trust/authentication with the client device 201 and may have various policies that are required in order to process the transaction card request (e.g., 7-day no password or phone number change, 7-day stability of the device, etc.) to ensure that the financial services provider trusts the client device 201.

If the authentication (e.g., step-up authentication) is confirmed 222, then the financial services provider backend 202 may grant 224 a token for data retrieval. In some embodiments, confirmation 222 may occur via authentication/cryptographic processes of a contactless card configured according to various embodiments (see, for example, FIGS. 6-13).

In some embodiments, the financial services provider backend 202 may provide the merchants 203*a-n* with a token for this transaction. In some embodiments, the token may identify a communication session established with the merchant. If the merchant 203*a-n* agrees to continue setting up the account (or adding the transaction card to an existing merchant account), the merchant 203*a-n* can come back with the token and an affirmative response 225 to retrieve this specific user's details to either open a new account or update the existing account with a new card number. In some embodiments, the token may operate as a header when multiple requests are coming and going from both backends 202, 203*a-n* to uniquely identify the transaction.

An exchange 225 for account information may occur between the financial services provider backend 202 and the merchant backend 203*a-n*. For example, in the exchange 2230 the merchant backend 203*a-n* may indicate to the financial services provider backend 202 whether an account exists at the merchant. If a match for the user is determined (e.g., via matching account number, email address, phone number, and/or the like) is found and an account exists, transaction card information (e.g., VCN and/or card number, CCV, expiration date, and/or the like) may be shared in future exchanges 225 (and/or 226). In various embodiments, if a match is not found, then a new account may be created and exchanges 225 may involve more account creation information (e.g., name, address, phone number, email address, and/or the like) may be required before card information can be shared, which may require multiple steps/exchanges 225.

Once the account has been established (either located or created), the merchant back end 203*a-n* may make a call to retrieve information 226, such as PII, PCI data, and/or the like. PCI data may be or may include a VCN and/or a card number, CCV, expiration date, and/or the like. Exchanges 225 and/or 226 may use a minimum amount of information to satisfy the transaction. For example, if an account is found in exchange 225, there is no need to exchange PII and only card information may be shared; however, PII may be shared, in addition to the transaction card information if an account is not found.

Figure 3:
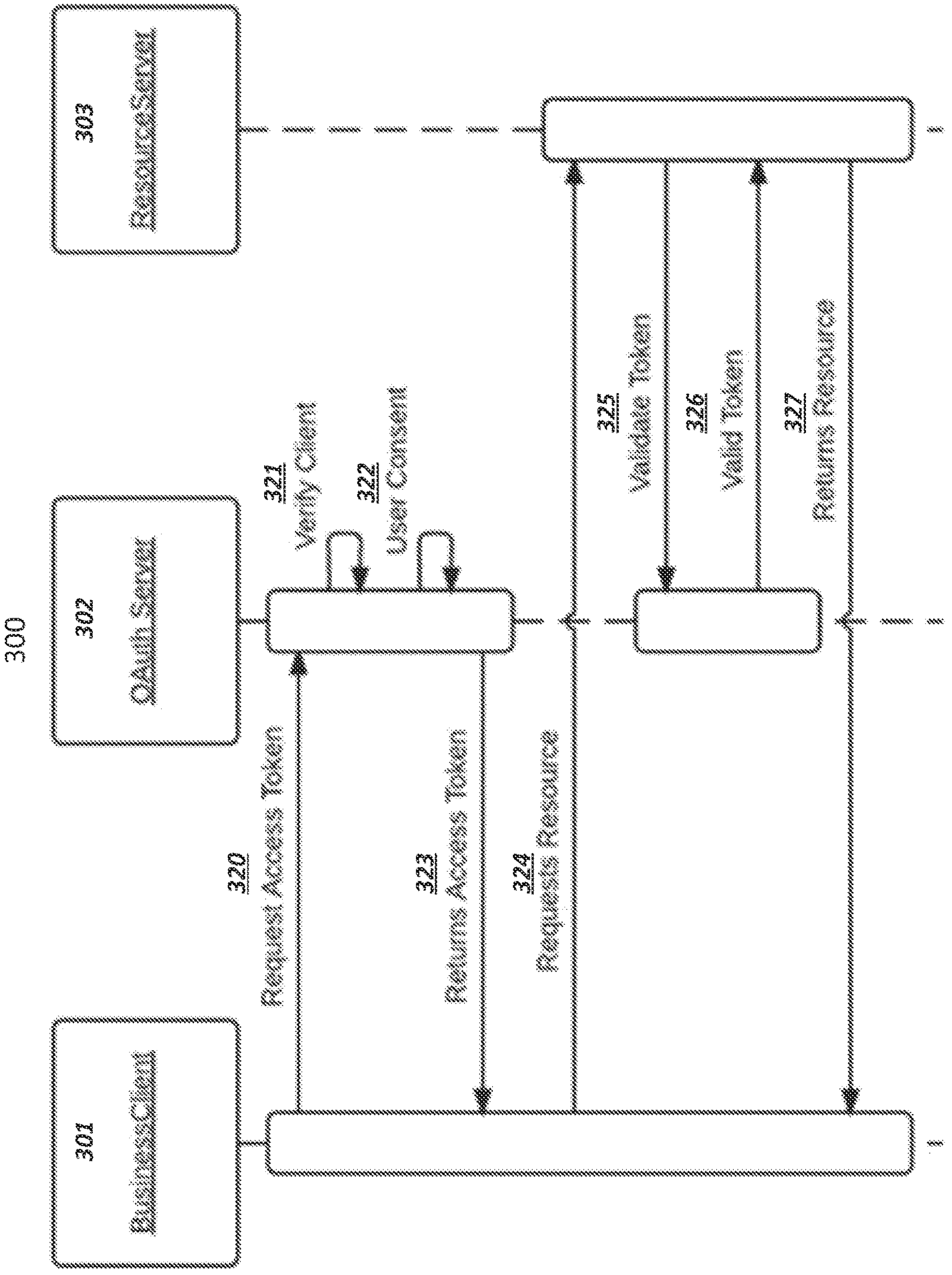
FIG. 3 depicts an exemplary operating environment in accordance with the present disclosure.

FIG. 3 depicts an exemplary operating environment in accordance with the present disclosure. As shown in FIG. 3, an operating environment 300 may include a business client 301, an OAuth server 302, and a resource server 303. In some embodiments, operating environment 300 may operate to perform an authentication process to perform functions described in accordance with the present disclosure. Although an OAuth server is depicted in FIG. 3, embodiments are not so limited, as the OAuth server may operate as an authentication server using various known authentication protocols other than OAuth authentication that may operate with the described embodiments.

A business client 301 may request an access token at step 320 from the OAuth server 302. The OAuth server 302 may perform various authentication processes, such as verifying 321 the business client 301 and/or obtaining user consent 322. Responsive to verification 321 and consent 322, the OAuth server 302 may return at step 323 an access token to the business client 301. The business client 301 may request at step 324 a resource from a resource server 303. In various embodiments, the request may include the token returned at step 323 to the business client 301 from the OAuth server 302. The resource server 303 may operate to validate 325 the token provided by the business client 301 with the OAuth server 302. If the token is valid at step 326, as indicated to the resource server 303 by the OAuth server 302, the resource server 303 may return, at step 327, a resource to the business client.

Included herein are one or more logic flows representative of exemplary methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by computer executable instructions stored on a non-transitory computer readable medium or machine readable medium. The embodiments are not limited in this context.

Figure 4:
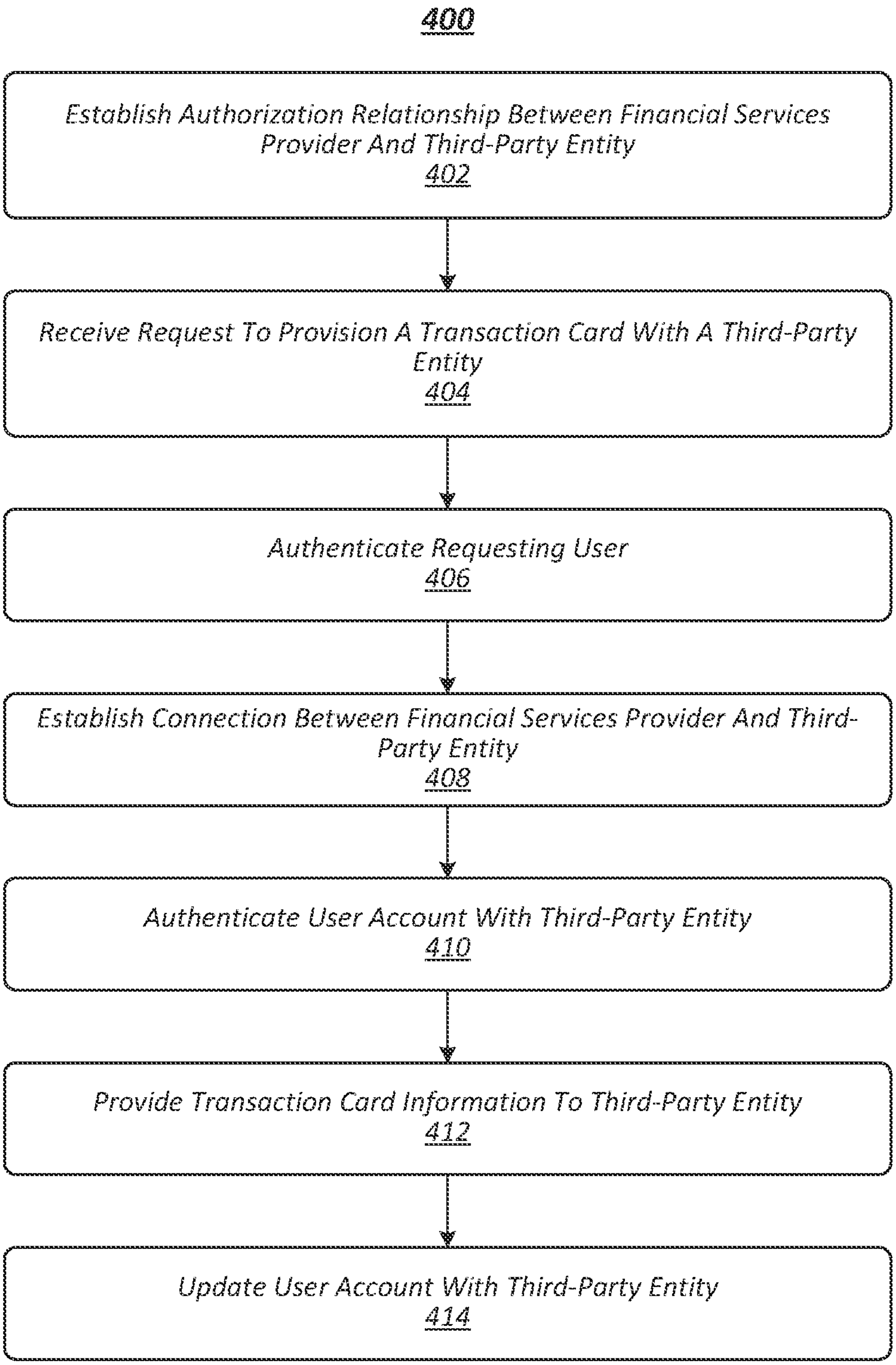
FIG. 4 illustrates an embodiment of a first logic flow in accordance with the present disclosure.

FIG. 4 illustrates an embodiment of a logic flow 400. The logic flow 400 may be representative of some or all of the operations executed by one or more embodiments described herein, such as operating environments or systems 100-300 and/or components thereof. In some embodiments, the logic flow 400 may be representative of some or all of the operations for provisioning a transaction card to multiple third-party entities according to some embodiments.

At block 402, the logic flow 400 may establish an authorization relationship between a financial services provider and a third-party entity. For example, financial services provider backend 202 may establish an authorization relationship, such as an OAuth relationship, with one or more merchants. The authorization relationship may allow the financial services provider to access a user account of a merchant or interact with a merchant to update (or allow the merchant to update with financial services provider provided information) a user account, such as an account of a user mutual to both the financial services provider and the merchant.

At block 404, the logic flow 400 may receive a request to provision a transaction card with a third-party entity. The request may be a payment card number request. For example, a user may have a credit card with a financial services provider that they would like to be associated as a payment source with a merchant. The user may access their financial services provider account (for instance, via an online platform, app, and/or the like) and submit a provision request through the financial services provider platform. In some embodiments, the request may include a transaction card (or cards) and a selection of third-party entities to provision the transaction card to. The request may include additional request information, such as card priority (for instance, transaction card should be the primary transaction card at Merchant A, but a secondary card with Merchant B), card use rules (for example, use the transaction card at Merchant A for all purchases, but only for recurring/subscription purchases at Merchant B, and/or the like), and/or other use specifications.

In some embodiments, the request may include a plurality of requests, wherein a respective payment card number request is received for each merchant of a plurality of merchants (or merchant websites). In various embodiments, a last payment card number request of the plurality of payment card number requests may be required to be received within a predetermined time period after receipt of a first payment card number request (or any previous request in a series of request) of the plurality of payment card number requests. In some embodiments, the predetermined time period may be about 5 minutes, about 10 minutes, about 20 minutes, about 30 minutes, about 60 minutes, or any time or range between any two of these values (including endpoints).

The logic flow 400 may authenticate the requesting user at block 406. For example, the financial services provider backend 202 may authenticate the user via username/password processes, multi-factor authentication, step-up authentication, OAuth processes, and/or the like. The financial services provider backend 202 may authenticate the user, the user device, and/or other elements associated with the requesting user.

At block 408, the logic flow 400 may establish a connection between the financial services provider and the third-party entity. For example, the financial services provider backend 202 may establish a network connection with one or more merchant backends 203*a-n*. In some embodiments, the financial services provider backend 202 and the merchant backends 203*a-n* may have dedicated communication channels for facilitating transaction card provisioning.

At block 410, the logic flow 400 may operate to authenticate the user account with the third-party entity. For example, the financial services provider backend 202 (alone or via prompts/exchanges with the client device 201) may provide account information to a merchant backend 203*a-n* to allow the merchant backend 203*a-n* to locate the user account associated with the provisioning request. For example, the financial services provider backend 202 may request merchant account information from the user or request that the user login to their merchant account (including via a merchant interface outside of or within the financial services provider platform, for instance, the same or similar to a PayPal® login interface to process payment within a merchant platform.). In another example, the financial services provider backend 202 may store the merchant authentication information in the user account with the financial services provider, for instance, during a registration process registering the merchant as a provisioning entity. In a further example, if a user account does not exist with the merchant, the financial services provider backend 202 may facilitate the establishment of a new account with the merchant.

At block 412, the logic flow 400 may provide transaction card information to the third-party entity. For example, responsive to authentication of the user (and/or user device) and establishment by the financial services provider that a user account exists with the merchant (either newly created or pre-existing) that is verified by the financial services provider (including through confirmation by the merchant backend 203*a*), the financial services provider backend 202 may provide the transaction card information to the third-party entity. The transaction card information may include information sufficient for the user to use the card via the merchant, such as card owner name, card owner address, VCN and/or card number, expiration date, CVV, and/or the like.

The logic flow 400 may update the user account at block 414. For example, the merchant backend 203*a-n* may update the user account with the merchant system to include the transaction card as a payment source.

Figure 5:
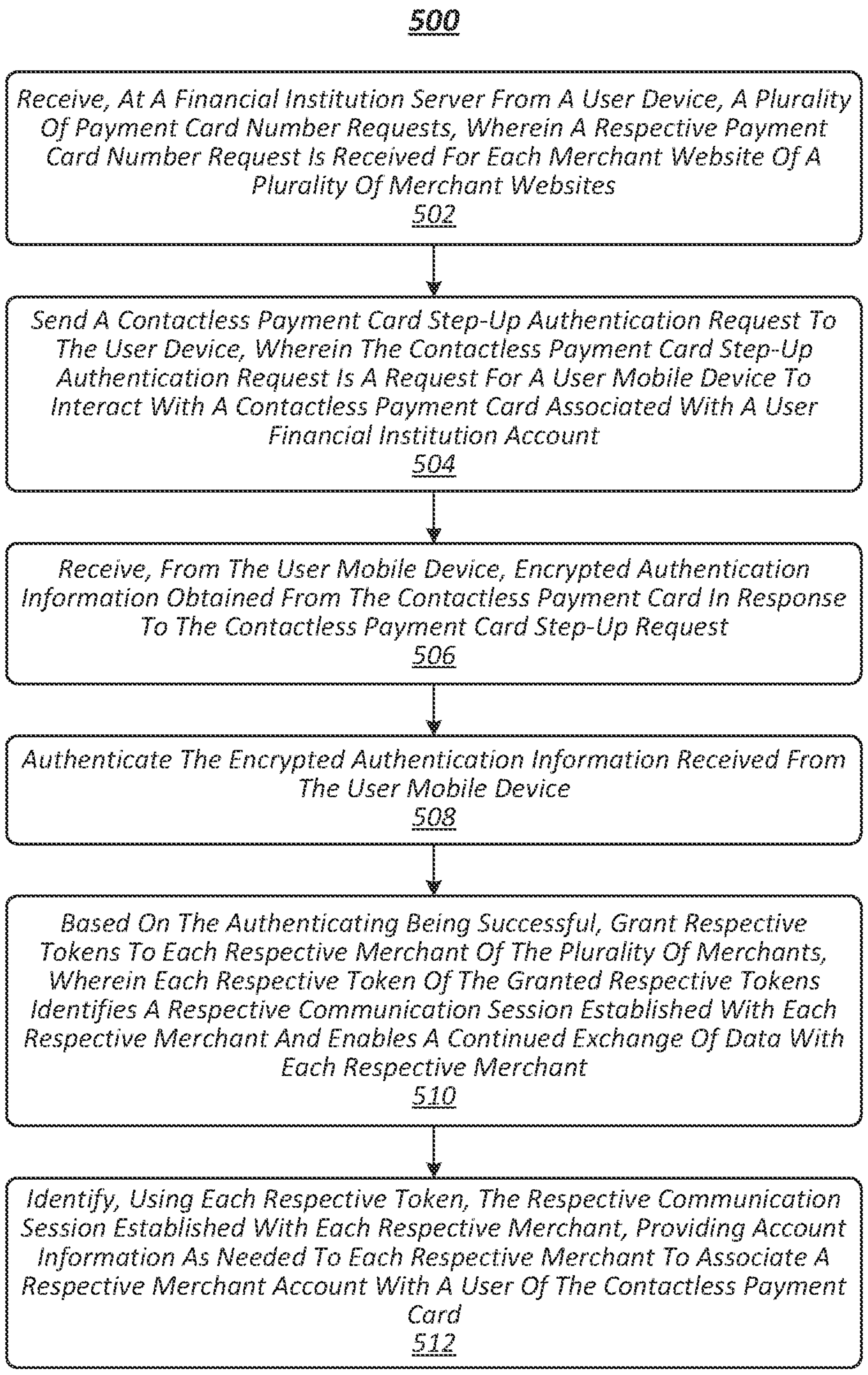
FIG. 5 illustrates an embodiment of a second logic flow in accordance with the present disclosure.

FIG. 5 illustrates an embodiment of a logic flow 500. The logic flow 500 may be representative of some or all of the operations executed by one or more embodiments described herein, such as operating environments or systems 100-300 and/or components thereof. In some embodiments, the logic flow 500 may be representative of some or all of the operations for provisioning a transaction card to multiple third-party entities according to some embodiments.

At block 502, the logic flow 500 may receive, at a financial institution server from a user device, a plurality of payment card number requests, wherein a respective payment card number request is received for each merchant website of a plurality of merchant websites. For example, client device 201 may submit a request (which may be or may include request 220) to financial services provider backend 202.

At block 504, the logic flow 500 may send a contactless payment card step-up authentication request to the user device, wherein the contactless payment card step-up authentication request is a request for a user mobile device to interact with a contactless payment card associated with a user financial institution account. For example, financial services provider backend 202 may send a requests 221 for authentication, such as a multi-factor or "step up" authentication to client device 201.

At block 506, the logic flow 500 may receive, from the user mobile device, encrypted authentication information obtained from the contactless payment (see, for example, FIGS. 6-13) card in response to the contactless payment card step-up request. At block 508, the logic flow 500 may authenticate the encrypted authentication information received from the user mobile device. For example, encrypted authentication information may be obtained via authentication/cryptographic processes of a contactless card configured according to various embodiments (see, for example, FIGS. 6-13).

At block 510, the logic flow 500 may, based on the authenticating being successful, grant respective tokens to each respective merchant of the plurality of merchants, wherein each respective token of the granted respective tokens identifies a respective communication session established with each respective merchant and enables a continued exchange of data with each respective merchant.

At block 512, the logic flow 500 may identify, using each respective token, the respective communication session established with each respective merchant, providing account information as needed to each respective merchant to associate a respective merchant account with a user of the contactless payment card.

Figure 6:
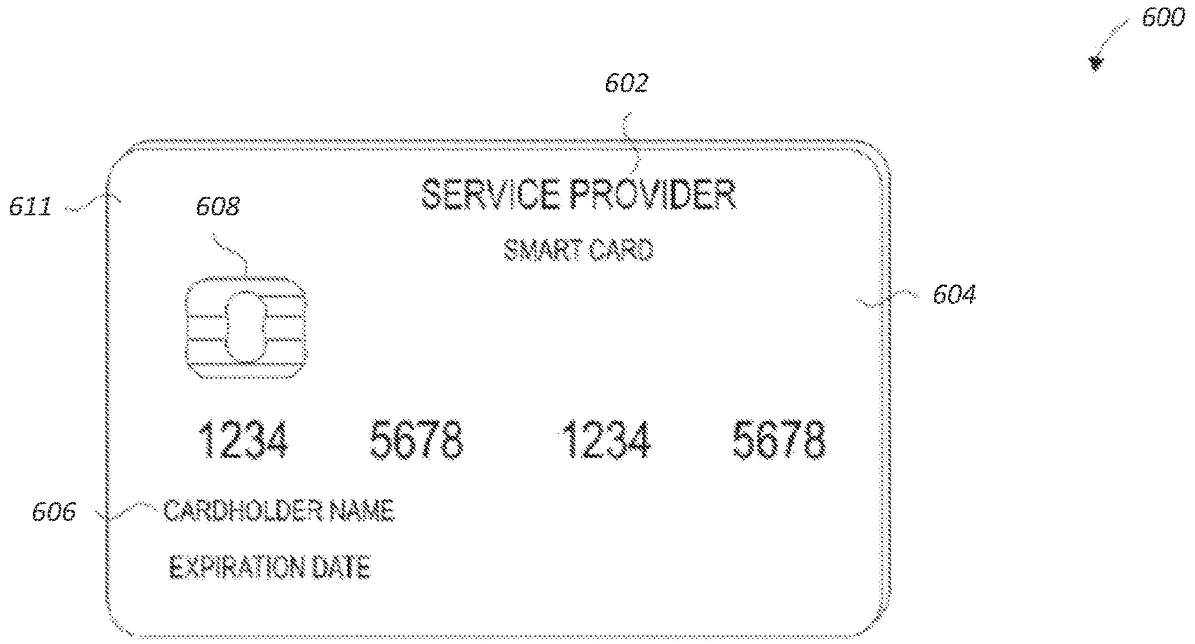
FIG. 6 illustrates a contactless card in accordance with the present disclosure.

FIG. 6 is a schematic 600 illustrating an example configuration of a contactless card 611, which may include a payment card, such as a credit card, debit card, or gift card, issued by a service provider as displayed as service provider indicia 602 on the front or back of the contactless card 611. In some examples, the contactless card 611 is not related to a payment card, and may include, without limitation, an identification card. In some examples, the transaction card may include a dual interface contactless payment card, a rewards card, and so forth. The contactless card 611 may include a substrate 604, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 611 may have physical characteristics compliant with the ID-1 format of the ISO/IEC 7816 standard, and the transaction card may otherwise be compliant with the ISO/IEC 14443 standard. However, it is understood that the contactless card 611 according to the present disclosure may have different characteristics, and the present disclosure does not require a transaction card to be implemented in a payment card.

The contactless card 611 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 611 may also include processing circuitry, antenna and other components as will be further discussed in FIG. 7. These components may be located behind the contact pad 608 or elsewhere on the substrate 604, e.g. within a different layer of the substrate 604, and may electrically and physically coupled with the contact pad 608. The contactless card 611 may also include a magnetic strip or tape, which may be located on the back of the card (not shown in FIG. 6). The contactless card 611 may also include a Near-Field Communication (NFC) device coupled with an antenna capable of communicating via the NFC protocol. Embodiments are not limited in this manner.

Figure 7:
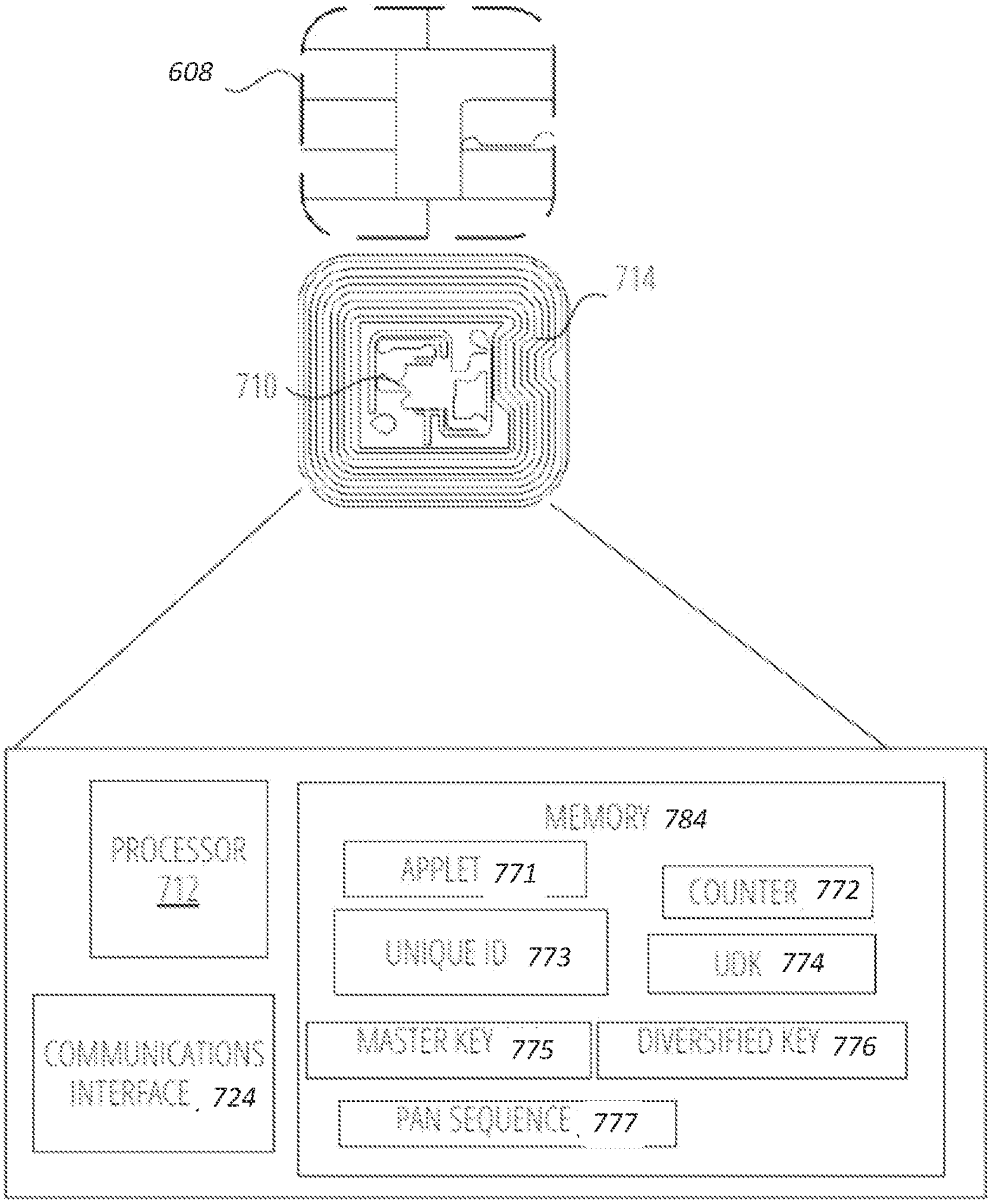
FIG. 7 illustrates a transaction card component in accordance with the present disclosure.

As illustrated in FIG. 7, the contact pad 608 of contactless card 611 may include processing circuitry 710 for storing, processing, and communicating information, including a processor 712, a memory 784, and one or more communications interface 724. It is understood that the processing circuitry 710 may contain additional components, including processors, memories, error and parity/CRC checkers, data encoders, anticollision algorithms, controllers, command decoders, security primitives and tamper proofing hardware, as necessary to perform the functions described herein.

The memory 784 may be a read-only memory, write-once read-multiple memory or read/write memory, e.g., RAM, ROM, and EEPROM, and the contactless card 611 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 784 may be encrypted memory utilizing an encryption algorithm executed by the processor 712 to encrypted data.

The memory 784 may be configured to store one or more applets 110, one or more counters 772, a unique ID 773, the master key 775, the UDK 774, diversified key 776, and the PAN sequence 777. The one or more applets 771 may comprise one or more software applications configured to execute on one or more contactless cards 611, such as a Java® Card applet. However, it is understood that applets 771 are not limited to Java Card applets, and instead may be any software application operable on contactless cards or other devices having limited memory. The one or more counters 772 may comprise a numeric counter sufficient to store an integer. The unique ID 773 may comprise a unique alphanumeric identifier assigned to the contactless card 611, and the identifier may distinguish the contactless card 611 from other contactless cards 611. In some examples, the unique ID 773 may identify both a customer and an account assigned to that customer.

The processor 712 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 712 and memory 784 elements located within the contact pad 608.

In some examples, the contactless card 611 may comprise one or more antenna(s) 714. The one or more antenna(s) 714 may be placed within the contactless card 611 and around the processing circuitry 710 of the contact pad 608. For example, the one or more antenna(s) 714 may be integral with the processing circuitry 710 and the one or more antenna(s) 714 may be used with an external booster coil. As another example, the one or more antenna(s) 714 may be external to the contact pad 608 and the processing circuitry 710.

In an embodiment, the coil of contactless card 611 may act as the secondary of an air core transformer. The terminal may communicate with the contactless card 611 by cutting power or amplitude modulation. The contactless card 611 may infer the data transmitted from the terminal using the gaps in the power connection of the contactless card 611, which may be functionally maintained through one or more capacitors. The contactless card 611 may communicate back by switching a load on the coil of the contactless card 611 or load modulation. Load modulation may be detected in the terminal's coil through interference. More generally, using the antenna(s) 714, processor 712, and/or the memory 784, the contactless card 611 provides a communications interface to communicate via NFC, Bluetooth, and/or Wi-Fi communications.

As explained above, contactless card 611 may be built on a software platform operable on smart cards or other devices having limited memory, such as JavaCard, and one or more or more applications or applets may be securely executed. Applet 771 may be added to contactless cards to provide a one-time password (OTP) for multifactor authentication (MFA) in various mobile application-based use cases. Applet 771 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include a cryptogram, and any other data.

One example of an NDEF OTP is an NDEF short-record layout (SR=1). In such an example, one or more applet 771 may be configured to encode the OTP as an NDEF type 4 well known type text tag. In some examples, NDEF messages may comprise one or more records. The applet 771 may be configured to add one or more static tag records in addition to the OTP record.

In some examples, the one or more applet s771 may be configured to emulate an RFID tag. The RFID tag may include one or more polymorphic tags. In some examples, each time the tag is read, different cryptographic data is presented that may indicate the authenticity of the contactless card. Based on the one or more applets 110, an NFC read of the tag may be processed, the data may be transmitted to a server, such as a server of a banking system, and the data may be validated at the server.

In some examples, the contactless card 611 and server may include certain data such that the card may be properly identified. The contactless card 611 may include one or more unique identifiers (not pictured). Each time a read operation takes place, the counter 772 may be configured to increment. In some examples, each time data from the contactless card 611 is read (e.g., by a mobile device), the counter 772 is transmitted to the server for validation and determines whether the counter 772 are equal (as part of the validation) to a counter of the server.

The one or more counters 772 may be configured to prevent a replay attack. For example, if a cryptogram has been obtained and replayed, that cryptogram is immediately rejected if the counter 772 has been read or used or otherwise passed over. If the counter 772 has not been used, it may be replayed. In some examples, the counter that is incremented on the contactless card 611 is different from the counter that is incremented for transactions. The contactless card 611 is unable to determine the application transaction counter 772 since there is no communication between applets 771 on the contactless card 611. In some examples, the contactless card 611 may comprise a first applet 440-1, which may be a transaction applet, and a second applet 440-2. Each applet 440-1 and 440-2 may comprise a respective counter 772.

In some examples, the counter 772 may get out of sync. In some examples, to account for accidental reads that initiate transactions, such as reading at an angle, the counter 772 may increment but the application does not process the counter 772. In some examples, when the device 102 is woken up, NFC may be enabled and the computing device 102 may be configured to read available tags, but no action is taken responsive to the reads.

To keep the counter 772 in sync, an application, such as a background application, may be executed that would be configured to detect when the computing device 102 wakes up and synchronize with the server of a banking system indicating that a read that occurred due to detection to then move the counter 772 forward. In other examples, Hashed One Time Password may be utilized such that a window of mis-synchronization may be accepted. For example, if within a threshold of 10, the counter 772 may be configured to move forward. But if within a different threshold number, for example within 10 or 600, a request for performing re-synchronization may be processed which requests via one or more applications that the user tap, gesture, or otherwise indicate one or more times via the user's device. If the counter 772 increases in the appropriate sequence, then it possible to know that the user has done so.

The key diversification technique described herein with reference to the counter 772, master key 775, UDK 774, and diversified key 776, is one example of encryption and/or decryption a key diversification technique. This example key diversification technique should not be considered limiting of the disclosure, as the disclosure is equally applicable to other types of key diversification techniques.

During the creation process of the contactless card 611, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 611. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys (e.g., the UDKs 774) and the counter may be used as diversification data. For example, each time the contactless card 611 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 8:
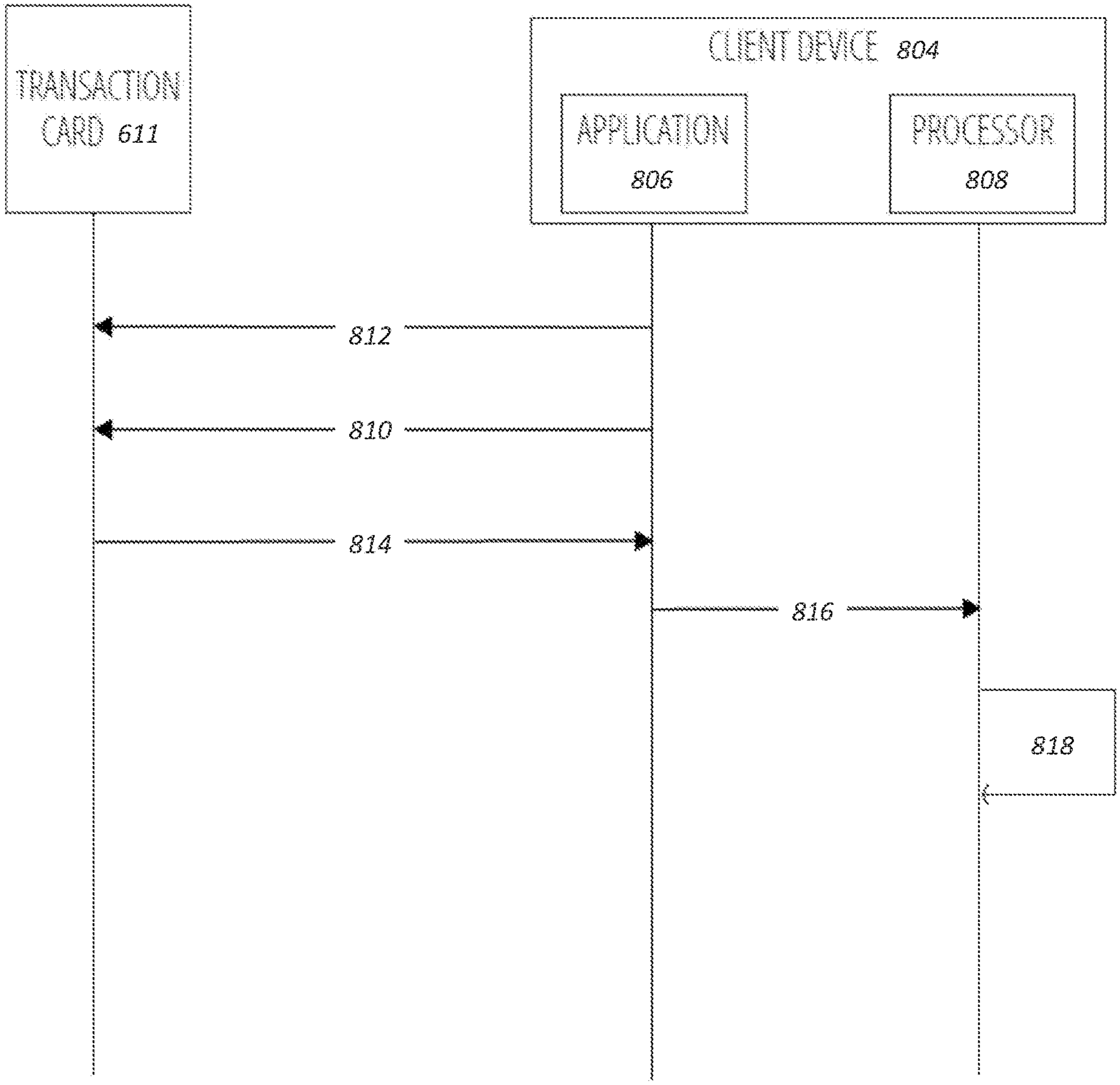
FIG. 8 illustrates a sequence flow in accordance with the present disclosure.

FIG. 8 is a timing diagram illustrating an example sequence for providing authenticated access according to one or more embodiments of the present disclosure. Sequence flow 800 may include contactless card 611 and a client device, which may include an application 802 and processor 804.

At line 812, the application 802 communicates with the contactless card 611 (e.g., after being brought near the contactless card 611). Communication between the application 802 and the contactless card 611 may involve the contactless card 611 being sufficiently close to a card reader (not shown) of the client device 804 to enable data transfer (for instance, via NFC) between the application 802 and the contactless card 611.

At line 810, after communication has been established between client device 804 and contactless card 611, contactless card 611 generates a message authentication code (MAC) cryptogram. In some examples, this may occur when the contactless card 611 is read by the application 802. In particular, this may occur upon a read, such as an NFC read, of a near field data exchange (NDEF) tag, which may be created in accordance with the NFC Data Exchange Format. For example, a reader application, such as application 802, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 611 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 802 may be configured to transmit a request to contactless card 611, the request comprising an instruction to generate a MAC cryptogram.

At line 814, the contactless card 611 sends the MAC cryptogram to the application 802. In some examples, the transmission of the MAC cryptogram occurs via NFC, however, the present disclosure is not limited thereto. In other examples, this communication may occur via Bluetooth, Wi-Fi, or other means of wireless data communication. At line 812, the application 802 communicates the MAC cryptogram to the processor 804.

At line 816, the processor 804 verifies the MAC cryptogram pursuant to an instruction from the application 132. For example, the MAC cryptogram may be verified, as explained below. In some examples, verifying the MAC cryptogram may be performed by a device other than client device 804, such as a server of a banking system in data communication with the client device 804. For example, processor 804 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 9:
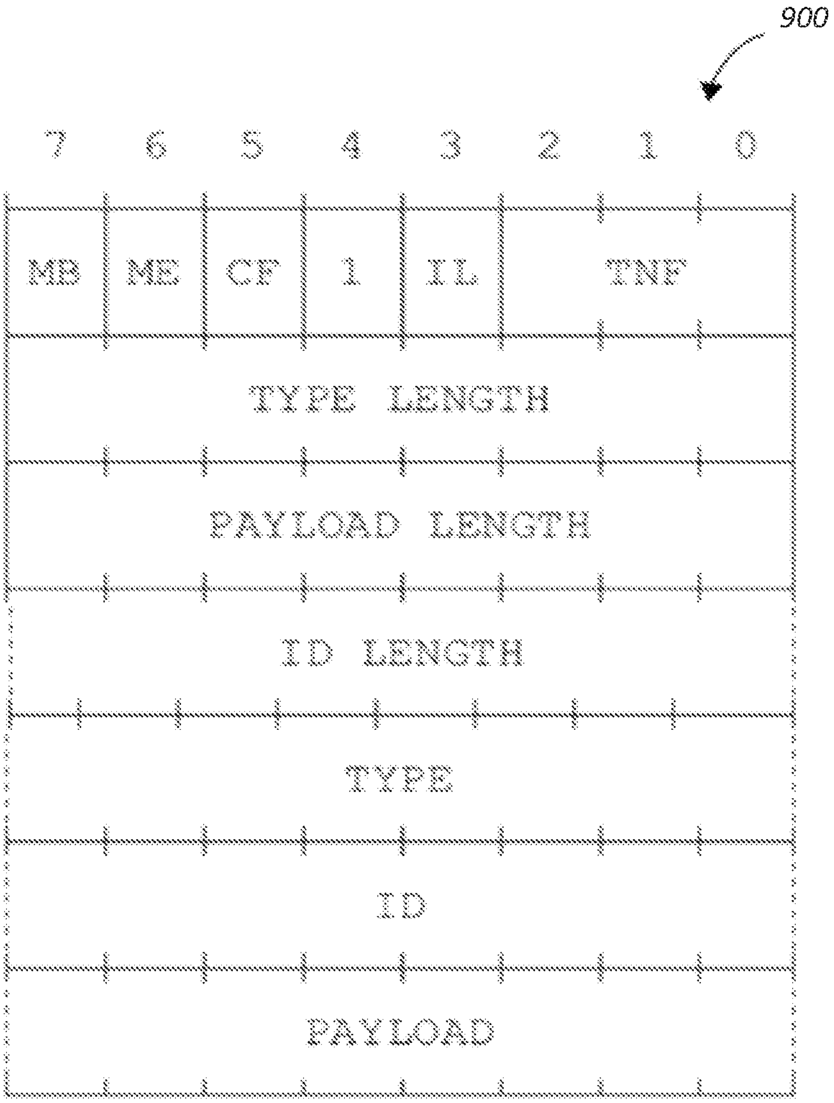
FIG. 9 illustrates a data structure in accordance with the present disclosure.

FIG. 9 illustrates an NDEF short-record layout (SR=1) data structure 900 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 10:
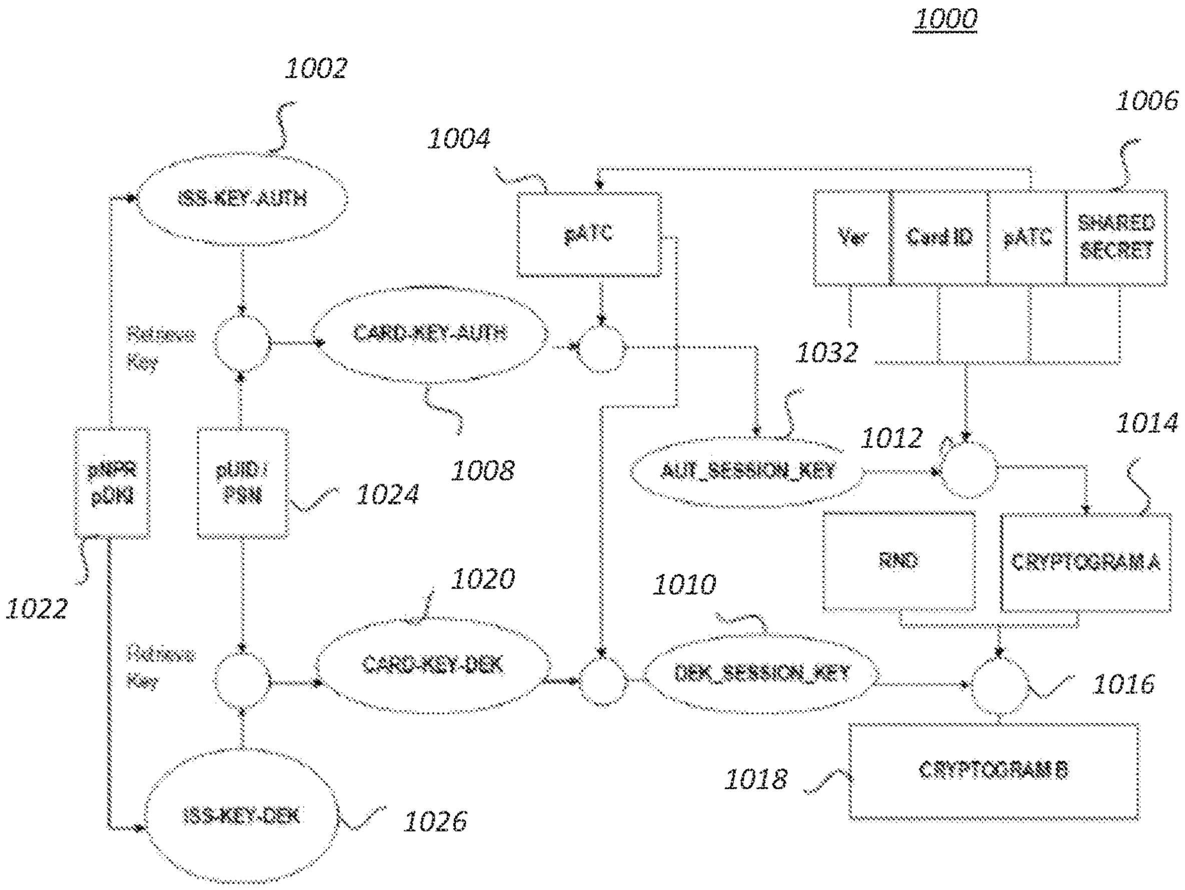
FIG. 10 is a diagram of a key system in accordance with the present disclosure.

FIG. 10 illustrates a diagram of a system 1000 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1002, 1026 may be required for each part of the portfolio on which the one or more applets is issued. For example, the first master key 1002 may comprise an Issuer Cryptogram Generation/Authentication Key (Iss-Key-Auth) and the second master key 1026 may comprise an Issuer Data Encryption Key (Iss-Key-DEK). As further explained herein, two issuer master keys 1002, 1026 are diversified into card master keys 1008, 1020, which are unique for each card. In some examples, a network profile record ID (pNPR) 522 and derivation key index (pDKI) 1024, as back office data, may be used to identify which Issuer Master Keys 1002, 1026 to use in the cryptographic processes for authentication. The system performing the authentication may be configured to retrieve values of pNPR 1022 and pDKI 1024 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1008 and Card-Key-Dek 1020). The session keys (Aut-Session-Key 1032 and DEK-Session-Key 1010) may be generated by the one or more applets and derived by using the application transaction counter (pATC) 1004 with one or more algorithms. To fit data into the one or more algorithms, only the 2 low order bytes of the 4-byte pATC 1004 is used. In some examples, the four byte session key derivation method may comprise: F1:=PATC (lower 2 bytes) ||'F0'||'00'||PATC (four bytes) F1:=PATC (lower 2 bytes) ||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 1004 counter. At each tap of the contactless card, pATC 1004 is configured to be updated, and the card master keys Card-Key-AUTH 508 and Card-Key-DEK 1020 are further diversified into the session keys Aut-Session-Key 1032 and DEK-Session-KEY 1010. pATC 1004 may be initialized to zero at personalization or applet initialization time. In some examples, the pATC counter 1004 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size.

The MAC may be performed by a function key (AUT-Session-Key) 1032. The data specified in cryptogram may be processed with javacard.signature method:

ALG_DES_MAC8_ISO9797_1_M2_ALG3 to correlate to EMV ARQC verification methods. The key used for this computation may comprise a session key AUT-Session-Key 1032, as explained above. As explained above, the low order two bytes of the counter may be used to diversify for the one or more MAC session keys. As explained below, AUT-Session-Key 1032 may be used to MAC data 1006, and the resulting data or cryptogram A 1014 and random number RND may be encrypted using DEK-Session-Key 1010 to create cryptogram B or output 1018 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1010 derived from the Card-Key-DEK 1020. In this case, the ATC value for the session key derivation is the least significant byte of the counter pATC 1004.

The format below represents a binary version example embodiment. Further, in some examples, the first byte may be set to ASCII 'A'.

| | | | | |
|---|---|---|---|---|
| Message Format | | | | |
| 1 | 2 | 4 | 8 | 8 |
| 0x43 (Message Type 'A') | Version | pATC | RND | Cryptogram A (MAC) |
| Cryptogram A (MAC) | 8 bytes | | | |
| Mac of | | | | |
| 2 | 8 | 4 | 4 | 18 bytes input data |
| Version | pUID | pATC | Shared Secret | |
| Message Format | | | | |
| 1 | 2 | 4 | | 16 |
| 0x43 (Message Type 'A') | Version | pATC | | Cryptogram B |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| | | | | |
|---|---|---|---|---|
| Message Format | | | | |
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |
| Message Format | | | | |
| 2 | 8 | 4 | | 16 |
| Version | pUID | pATC | | Cryptogram B |
| 8 bytes | | | | |
| 8 | | 4 | 4 | 18 bytes input data |
| pUID | pUID | pATC | Shared Secret | |
| Cryptogram B | 16 | | | |
| Sym Encryption of | | | | |
| 8 | 8 | | | |
| RND | Cryptogram A | | | |

The UID field of the received message may be extracted to derive, from master keys Iss-Key-AUTH 502 and Iss-Key-DEK 1026, the card master keys (Card-Key-Auth 1008 and Card-Key-DEK 1020) for that particular card. Using the card master keys (Card-Key-Auth 508 and Card-Key-DEK 1020), the counter (pATC) field of the received message may be used to derive the session keys (Aut-Session-Key 1032 and DEK-Session-Key 1010) for that particular card. Cryptogram B 1018 may be decrypted using the DEK-Session-KEY, which yields cryptogram A 1014 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1014, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1032. The input data 1006 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1012, data 1006 is processed through the MAC using Aut-Session-Key 1032 to produce MAC output (cryptogram A) 1014, which is encrypted.

In order to provide additional protection against brute force attacks exposing the keys on the card, it is desirable that the MAC cryptogram 1014 be enciphered. In some examples, data or cryptogram A 1014 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1010. In the encryption operation 1016, data or cryptogram A 1014 and RND are processed using DEK-Session-Key 510 to produce encrypted data, cryptogram B 1018. The cryptogram 1014 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 11:
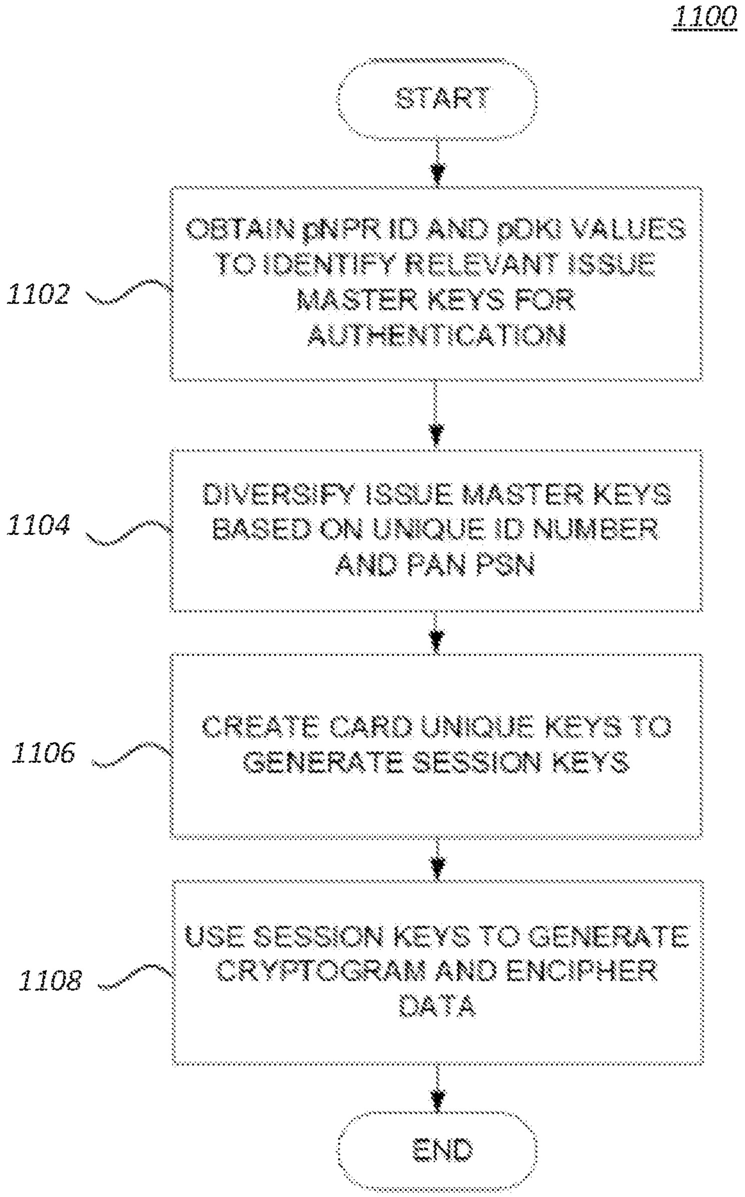
FIG. 11 is a flowchart of a method of generating a cryptogram in accordance with the present disclosure.

FIG. 11 illustrates a method 1100 for generating a cryptogram. For example, at block 1102, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1104, Issuer Master Keys may be diversified by combining them with the card's unique ID number (pUID) and the PAN sequence number (PSN) of one or more applets, for example, a payment applet.

At block 1106, Card-Key-Auth and Card-Key-DEK (unique card keys) may be created by diversifying the Issuer Master Keys to generate session keys which may be used to generate a MAC cryptogram.

At block 1108, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 12:
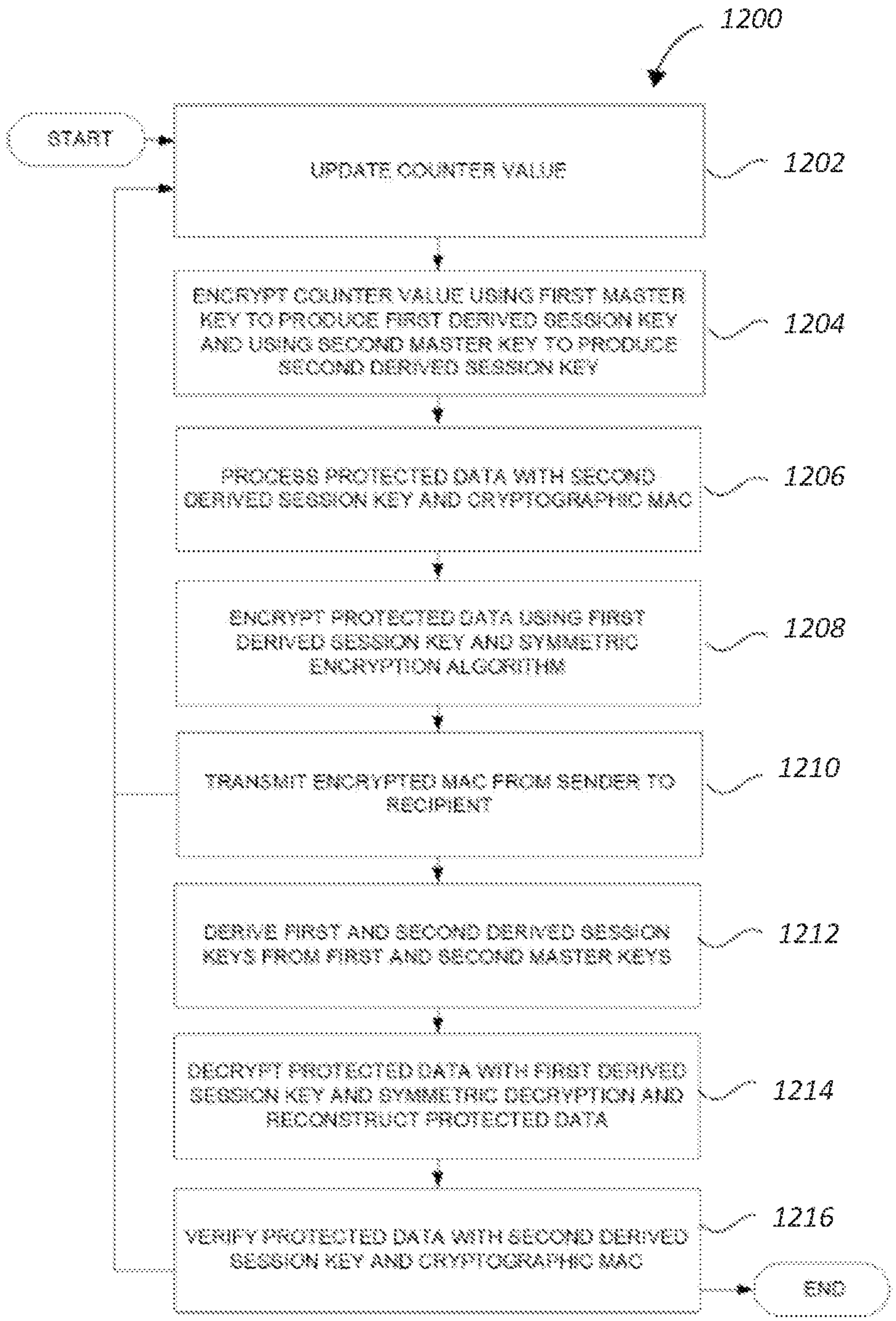
FIG. 12 illustrates one or more features of the subject matter in accordance with the present disclosure.

FIG. 12 depicts an exemplary process 1200 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1202, and other data, such as data to be protected, which it may secure share with the recipient.

At block 1204, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1206, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1208, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1210, the encrypted MAC is transmitted, from the sender to the recipient, with sufficient information to identify additional secret information (such as shared secret, master keys, etc.), for verification of the cryptogram.

At block 1212, the recipient uses the received counter value to independently derive the two derived session keys from the two master keys as explained above.

At block 1214, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1216, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1202) and a new set of session keys may be created (at block 1210). In some examples, the combined random data may be discarded.

Figure 13:
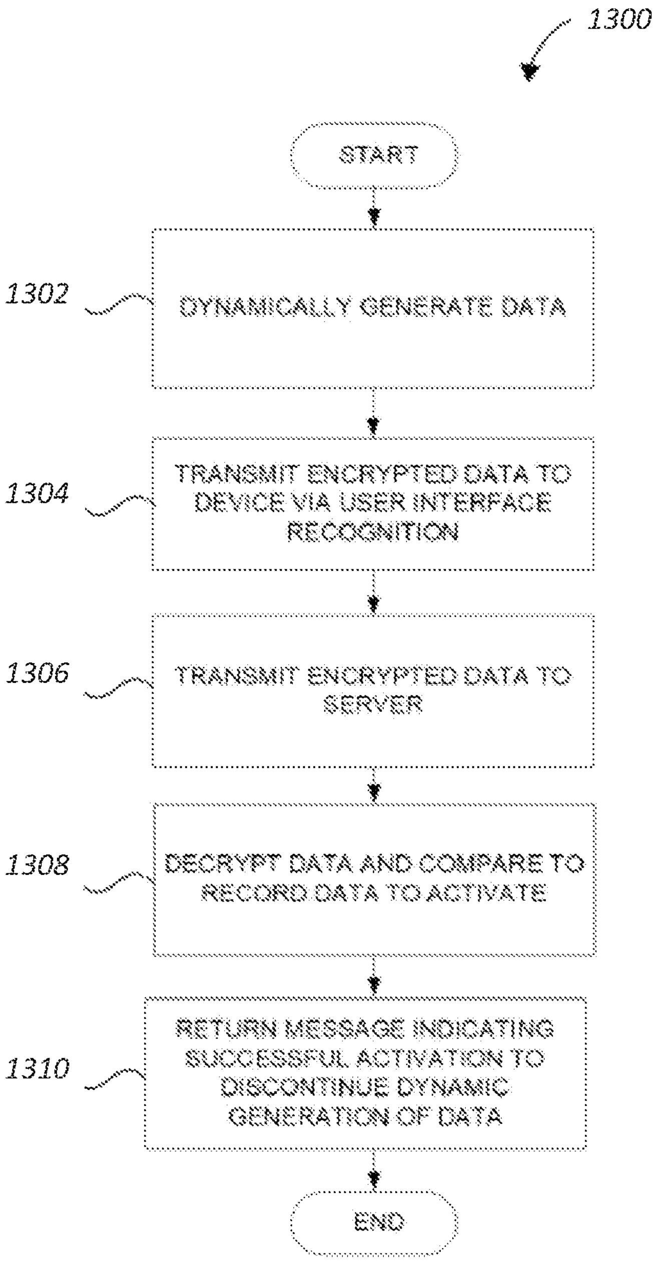
FIG. 13 illustrates one or more features of the subject matter in accordance with the present disclosure

FIG. 13 illustrates a method 1300 for card activation according to an example embodiment. For example, card activation may be completed by a system including a card, a device, and one or more servers. The contactless card, device, and one or more servers may reference same or similar components that were previously explained above, such as contactless card 132, client device 134, and a server.

In block 1302, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1304, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1306, the one or more portions of the data may be communicated to one or more servers, such as a card issuer server. For example, one or more encrypted portions of the data may be transmitted from the device to the card issuer server for activation of the card.

In block 1308, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1310, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Figure 14:
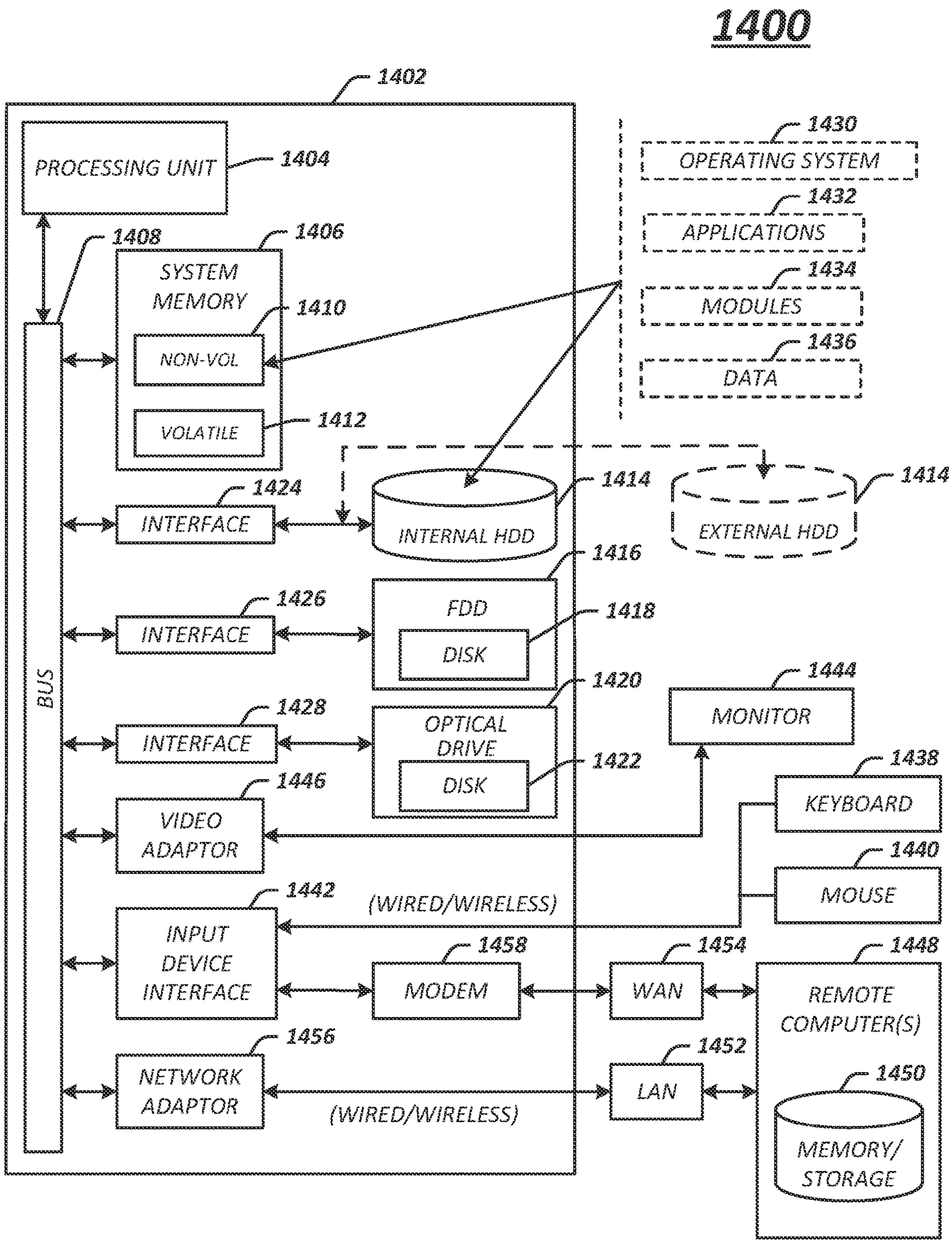
FIG. 14 illustrates a computer architecture in accordance with one embodiment.

FIG. 14 illustrates an embodiment of an exemplary computer architecture 1400 suitable for implementing various embodiments as previously described. In one embodiment, the computer architecture 1400 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing computer architecture 1400.

As shown in FIG. 14, the computer architecture 1400 includes a computer 1412 comprising a processor 1402, a system memory 1404 and a system bus 1406. The processor 1402 can be any of various commercially available processors. The computer 1412 may be representative of the computing device 102 and/or the server 118.

The system bus 1406 provides an interface for system components including, but not limited to, the system memory 1404 to the processor 1402. The system bus 1406 can be any of several types of bus structure that may further interconnect to a memory bus (with or without a memory controller), a peripheral bus, and a local bus using any of a variety of commercially available bus architectures. Interface adapters may connect to the system bus 1406 via slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1404 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1404 can include non-volatile 1408 and/or volatile 1410. A basic input/output system (BIOS) can be stored in the non-volatile 1408.

The computer 1412 may include various types of computer-readable storage media in the form of one or more lower speed memory units, including an internal (or external) hard disk drive 1414, a magnetic disk drive 1416 to read from or write to a removable magnetic disk 1418, and an optical disk drive 1420 to read from or write to a removable optical disk 1422 (e.g., a CD-ROM or DVD). The hard disk drive 1414, magnetic disk drive 1416 and optical disk drive 1420 can be connected to the system bus 1406 by an HDD interface 1424, and FDD interface 1426 and an optical disk drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1408, and volatile 1410, including an operating system 1430, one or more applications 1432, other program modules 1434, and program data 1436. In one embodiment, the one or more applications 1432, other program modules 1434, and program data 1436 can include, for example, the various applications and/or components of the system 100.

A user can enter commands and information into the computer 1412 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1402 through an input device interface 1442 that is coupled to the system bus 1406 but can be connected by other interfaces such as a parallel port, IEEE 1394 serial port, a game port, a USB port, an IR interface, and so forth.

A monitor 1444 or other type of display device is also connected to the system bus 1406 via an interface, such as a video adapter 1446. The monitor 1444 may be internal or external to the computer 1412. In addition to the monitor 1444, a computer typically includes other peripheral output devices, such as speakers, printers, and so forth.

The computer 1412 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all the elements described relative to the computer 1412, although, for purposes of brevity, only a memory and/or storage device 1450 is illustrated. The logical connections depicted include wire/wireless connectivity to a local area network 1452 and/or larger networks, for example, a wide area network 1454. Such LAN and WAN networking environments are commonplace in offices and companies, and facilitate enterprise-wide computer networks, such as intranets, all of which may connect to a global communications network, for example, the Internet.

When used in a local area network 1452 networking environment, the computer 1412 is connected to the local area network 1452 through a wire and/or wireless communication network interface or network adapter 1456. The network adapter 1456 can facilitate wire and/or wireless communications to the local area network 1452, which may also include a wireless access point disposed thereon for communicating with the wireless functionality of the network adapter 1456.

When used in a wide area network 1454 networking environment, the computer 1412 can include a modem 1458, or is connected to a communications server on the wide area network 1454 or has other means for establishing communications over the wide area network 1454, such as by way of the Internet. The modem 1458, which can be internal or external and a wire and/or wireless device, connects to the system bus 1406 via the input device interface 1442. In a networked environment, program modules depicted relative to the computer 1412, or portions thereof, can be stored in the remote memory and/or storage device 1450. It will be appreciated that the network connections shown are exemplary and other means of establishing a communications link between the computers can be used.

The computer 1412 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 6-13 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:

establishing, at a financial institution server, a secure network connection between the financial institution server and a user device;

receiving, at a financial institution server from the user device via the secure connection, a plurality of payment card number requests, wherein a respective payment card number request is received for each merchant website of a plurality of merchant websites;

sending an authentication request to the user device, wherein the authentication request is a request for a user of the user device to bring a contactless payment card associated with a user financial institution account within a near field communication (NFC) range of the user device;

receiving, from the user device, encrypted authentication information received from the contactless payment card in response to the authentication request, the encrypted authentication information received after the contactless payment card is brought within NFC range of the user device;

authenticating the encrypted authentication information received from the user device;

based on the authenticating being successful, granting respective tokens to each respective merchant of the plurality of merchants, wherein each respective token of the granted respective tokens identifies a respective communication session established with each respective merchant and enables a continued exchange of data with each respective merchant; and using each respective token to identify the respective communication session established with each respective merchant, providing account information as needed to each respective merchant to associate a respective merchant account with a user of the contactless payment card.

2. The computer-implemented method of claim 1, wherein a last payment card number request of the plurality of payment card number requests is received within a predetermined time period; and wherein the encrypted authentication information is embedded within a universal resource locator (URL) sent from the contactless payment card and forwarded to the financial institution server.

3. The computer-implemented method of claim 2, wherein the predetermined time period is determined based on a time of a receipt of a first payment card number request of the plurality of payment card number requests.

4. The computer-implemented method of claim 2, wherein the predetermined time period is about 5 minutes, about 10 minutes, or about 20 minutes.

5. The computer-implemented method of claim 1, wherein the financial institution server is configured to use a corresponding granted respective token as a header of a communication message to uniquely identify a transaction.

6. The computer-implemented method of claim 1, wherein the secure connection is established based on identifying information of the user of the contactless payment card.

7. The computer-implemented method of claim 6, wherein the identifying information is received prior to receiving a first payment card number request of the plurality of payment card number requests.

8. The computer-implemented method of claim 1, wherein authenticating the encrypted authentication information received from the user device comprises: decrypting the encrypted authentication information; and confirming information input from the user device corresponds with the decrypted authentication information accessible by the financial institution server.

9. The computer-implemented method of claim 8, wherein authenticating the encrypted authentication information received from the user device comprises, upon successful confirmation, generating an authorization to grant the respective tokens for each payment card number request of the plurality of payment card number requests.

10. A computer-implemented method, comprising:

establishing, at a financial institution server, a secure network connection between the financial institution server and a user device;

receiving, at the financial institution server from the user device, a first payment card number request from a first merchant of a plurality of merchants to associate user financial institution account information with a first merchant account;

sending a contactless payment card step-up authentication request to the user device, wherein the contactless payment card step-up authentication request is a request for a contactless payment card associated with the user financial institution account information to be brought within a near field communication (NFC) range of the user device;

receiving, from the user mobile device, encrypted authentication information maintained on the contactless payment card in response to the contactless payment card step-up request, the encrypted authentication information received after the contactless payment card is brought within NFC range of the user device;

authenticating the encrypted authentication information received from the user device; and based on the authenticating being successful, granting a first token to the first merchant, wherein the first token identifies a communication session with the first merchant and enables a continued exchange of data with the first merchant.

11. The computer-implemented method of claim 10, further comprising using the token to identify the communication session, providing account information as needed for the first merchant to populate the first merchant account; and wherein the encrypted authentication information is embedded within a universal resource locator (URL) send from the contactless payment card and forwarded to the financial institution server.

12. The computer-implemented method of claim 10, further comprising:

receive a second payment card number request from a second merchant;

based on the authenticating being successful, granting a second token to the second merchant, wherein the second token identifies a communication session with the second merchant and enables a continued exchange of data of user financial institution account data with the second merchant.

13. The computer-implemented method of claim 10, wherein the token enables retrieval of data by each merchant of the plurality of merchants.

14. The computer-implemented method of claim 10, wherein the user financial institution account information includes a payment card number of a user of the user device and payment card number-related information.

15. A non-transitory computer-readable storage medium, the computer-readable storage medium including instructions that when executed by a processor, cause the processor to:

establish a secure network connection between the processor and a user device;

receive, from the user device via the secure network connection, a plurality of payment card number requests, wherein a respective payment card number request is received for each merchant website of a plurality of merchant websites;

send a contactless payment card step-up authentication request to the user device, wherein the contactless payment card step-up authentication request is a request for a contactless payment card associated with a user financial institution account to be brought within a near field communication (NFC) range of the user device;

receive, from the user device, encrypted authentication information obtained from the contactless payment card in response to the contactless payment card step-up request, the encrypted authentication information received after the contactless payment card is brought within NFC range of the user device;

authenticate the encrypted authentication information received from the user device;

based on the authenticating being successful, grant respective tokens to each respective merchant of the plurality of merchants, wherein each respective token of the granted respective tokens identifies a respective communication session established with each respective merchant and enables a continued exchange of data with each respective merchant; and using each respective token to identify the respective communication session established with each respective merchant, provide account information as needed to each respective merchant to associate a respective merchant account with a user of the contactless payment card.

16. The computer-readable storage medium of claim 15, wherein a last payment card number request of the plurality of payment card number requests is received within a predetermined time period; and wherein the encrypted authentication information is embedded within a universal resource locator (URL) sent from the contactless payment card.

17. The computer-readable storage medium of claim 16, wherein the predetermined time period is determined based on a time of a receipt of a first payment card number request of the plurality of payment card number requests.

18. The computer-readable storage medium of claim 16, wherein the predetermined time period is about 5 minutes, about 10 minutes, or about 20 minutes.

19. The computer-readable storage medium of claim 15, wherein receiving the plurality of payment card number requests, the processor is operable to:

establish the secure network connection with the user device based on identifying information of the user received prior to receiving a first payment card number request of the plurality of payment card number requests.

20. The computer-readable storage medium of claim 19, wherein authenticating the encrypted authentication information received from the user device comprises:

decrypting the encrypted authentication information;

confirm information input from the user device corresponds with the decrypted authentication information; and upon successful confirmation, generate an authorization to grant the respective tokens for each payment card number request of the plurality of payment card number requests.

* * * * *